United States Patent
Zehfuss

(10) Patent No.: US 12,275,449 B2
(45) Date of Patent: Apr. 15, 2025

(54) REMOVABLE SEAT ATTACHMENT FOR A STROLLER

(71) Applicant: Baby Jogger, LLC, Atlanta, GA (US)

(72) Inventor: Mark Zehfuss, Glen Allen, VA (US)

(73) Assignee: Baby Jogger, LLC, Atlanta, GA (US)

(*) Notice: Subject to any disclaimer, the term of this patent is extended or adjusted under 35 U.S.C. 154(b) by 0 days.

(21) Appl. No.: 18/448,417

(22) Filed: Aug. 11, 2023

(65) Prior Publication Data

US 2023/0382447 A1 Nov. 30, 2023

Related U.S. Application Data

(63) Continuation of application No. 16/903,292, filed on Jun. 16, 2020, now Pat. No. 11,731,682, which is a
(Continued)

(51) Int. Cl.
| | |
|---|---|
| *B62B 3/00* | (2006.01) |
| *B62B 7/00* | (2006.01) |

(Continued)

(52) U.S. Cl.
CPC .............. *B62B 9/102* (2013.01); *B62B 7/006* (2013.01); *B62B 7/008* (2013.01); *B62B 7/14* (2013.01);
(Continued)

(58) Field of Classification Search
CPC ........... B62B 7/008; B62B 7/00; B62B 7/006; B62B 7/14; B62B 7/142; B62B 7/145; B62B 9/12; B62B 9/28; B62B 9/102
See application file for complete search history.

(56) References Cited

U.S. PATENT DOCUMENTS

| | | | |
|---|---|---|---|
| 1,707,186 A | | 3/1929 | Chatfield |
| RE19,139 E | * | 4/1934 | Gill .......................... A47D 1/06 |
| | | | 280/7.1 |

(Continued)

FOREIGN PATENT DOCUMENTS

| | | |
|---|---|---|
| CN | 2784272 Y | 5/2006 |
| CN | 1978264 A | 6/2007 |

(Continued)

OTHER PUBLICATIONS

Extended European Search report issued in EP Application No. 17161947.1, dated Aug. 29, 2017 (9 pages).
(Continued)

*Primary Examiner* — James M Dolak
(74) *Attorney, Agent, or Firm* — Eversheds Sutherland (US) LLP

(57) ABSTRACT

A stroller is provided with the ability to removably couple and decouple a seat from the stroller as needed. The stroller can include a stroller frame. The stroller can also include one or more front wheels attached to the stroller frame and one or more rear wheels attached to the stroller frame. The stroller can also include a first seat coupled to the stroller frame. The stroller can include first and second seat attachment housings. Each of the seat attachment housings can include a cavity for receiving a corresponding one of the first and second seat attachment adapters. Each of the seat attachment housings can also include a door cover to prevent access to the respective cavity when not in use. The seat attachment adapters can be coupled to the respective seat attachment housings and a second seat can be coupled to the seat attachment adapters.

16 Claims, 18 Drawing Sheets

Related U.S. Application Data continuation of application No. 15/912,901, filed on Mar. 6, 2018, now Pat. No. 10,730,543, which is a continuation of application No. 15/225,326, filed on Aug. 1, 2016, now Pat. No. 9,944,305, which is a continuation-in-part of application No. 14/597,420, filed on Jan. 15, 2015, now Pat. No. 9,403,550, which is a continuation of application No. 14/261,558, filed on Apr. 25, 2014, now Pat. No. 8,955,869, which is a continuation of application No. 12/631,375, filed on Dec. 4, 2009, now abandoned.

(60) Provisional application No. 62/311,224, filed on Mar. 21, 2016, provisional application No. 61/119,920, filed on Dec. 4, 2008.

(51) Int. Cl.
  *B62B 7/14* (2006.01)
  *B62B 9/10* (2006.01)
  *B62B 9/12* (2006.01)
  *B62B 9/28* (2006.01)
  *B62K 5/02* (2013.01)
  *B62K 27/00* (2006.01)
  *B62M 1/38* (2013.01)
  *B62K 13/00* (2006.01)

(52) U.S. Cl.
  CPC ............. *B62B 9/12* (2013.01); *B62B 9/28* (2013.01); *B62K 5/02* (2013.01); *B62K 27/003* (2013.01); *B62M 1/38* (2013.01); *B62B 3/008* (2013.01); *B62B 7/145* (2013.01); *B62K 13/00* (2013.01)

(56) References Cited

U.S. PATENT DOCUMENTS

| | | | |
|---|---|---|---|
| 3,000,645 A | 9/1961 | Schmidt | |
| 4,542,915 A | 9/1985 | Wheeler, III et al. | |
| 5,201,535 A | 4/1993 | Kato et al. | |
| 5,338,096 A | 8/1994 | Huang | |
| 5,417,449 A | 5/1995 | Shamie | |
| D360,392 S | 7/1995 | Lewandowski | |
| 5,567,008 A | 10/1996 | Richard | |
| 5,653,460 A | 8/1997 | Fogarty | |
| 5,794,951 A | 8/1998 | Corley et al. | |
| 6,045,145 A | 4/2000 | Lan | |
| 6,209,892 B1 | 4/2001 | Schaaf et al. | |
| 6,267,406 B1 * | 7/2001 | Huang | B62B 7/08 |
| | | | 280/47.38 |
| 6,286,844 B1 * | 9/2001 | Cone, II | B62B 9/28 |
| | | | 280/47.41 |
| 6,378,892 B1 | 4/2002 | Hsia | |
| 6,443,467 B1 | 9/2002 | Black | |
| 6,513,827 B1 * | 2/2003 | Barenbrug | B62B 7/145 |
| | | | 280/648 |
| 6,561,526 B1 | 5/2003 | Towns | |
| 6,585,284 B2 | 7/2003 | Sweeney et al. | |
| 6,676,140 B1 | 1/2004 | Gondobintoro | |
| 6,752,405 B1 | 6/2004 | Wright | |
| 6,851,693 B2 | 2/2005 | Haeggberg | |
| 6,923,467 B2 | 8/2005 | Hsia | |
| 7,210,699 B2 * | 5/2007 | Lan | B62B 7/10 |
| | | | 280/47.38 |
| 7,249,779 B2 | 7/2007 | Ehrenreich et al. | |
| 7,311,323 B1 | 12/2007 | Lan | |
| 7,320,471 B2 | 1/2008 | Maciejczyk | |
| 7,367,581 B2 | 5/2008 | Yang | |
| 7,377,537 B2 * | 5/2008 | Li | B62B 7/123 |
| | | | 280/47.38 |
| 7,401,803 B1 | 7/2008 | Lai | |
| 7,475,900 B2 * | 1/2009 | Cheng | B62B 7/08 |
| | | | 280/47.38 |
| 7,481,439 B2 | 1/2009 | Thompson | |
| 7,497,461 B2 | 3/2009 | Emerson | |
| D593,459 S * | 6/2009 | Liao | D12/129 |
| 7,677,585 B2 | 3/2010 | Rohl | |
| 7,681,894 B2 | 3/2010 | Santamaria | |
| 7,717,457 B2 | 5/2010 | Bearup et al. | |
| 7,766,366 B2 | 8/2010 | Li | |
| 7,832,755 B2 | 11/2010 | Nolan et al. | |
| 7,896,384 B2 | 3/2011 | Schonfeld | |
| 7,938,435 B2 | 5/2011 | Sousa et al. | |
| 7,971,897 B2 * | 7/2011 | Pike | B62B 7/123 |
| | | | 280/650 |
| 8,029,007 B2 | 10/2011 | Jones et al. | |
| 8,029,014 B2 | 10/2011 | Ahnert et al. | |
| 8,033,554 B2 | 10/2011 | Vieira et al. | |
| 8,061,732 B2 | 11/2011 | Song et al. | |
| 8,157,273 B2 | 4/2012 | Bar-Lev | |
| 8,231,136 B2 | 7/2012 | Fiore, Jr. | |
| 8,251,382 B2 | 8/2012 | Chen et al. | |
| 8,262,103 B2 | 9/2012 | Enserink et al. | |
| 8,313,115 B2 * | 11/2012 | Cheng | B62B 7/142 |
| | | | 280/47.38 |
| 8,336,904 B2 | 12/2012 | Kylstra | |
| 8,371,606 B2 | 2/2013 | Gower et al. | |
| 8,444,171 B2 | 5/2013 | Smith et al. | |
| 8,458,880 B2 | 6/2013 | Fiore, Jr. | |
| 8,585,075 B2 | 11/2013 | Zhong | |
| 8,596,670 B2 | 12/2013 | di Carimate et al. | |
| 8,602,441 B2 * | 12/2013 | Li | B62B 9/28 |
| | | | 280/642 |
| 8,651,502 B2 | 2/2014 | Winterhalter et al. | |
| 8,696,016 B2 | 4/2014 | Homan et al. | |
| 8,696,055 B2 | 4/2014 | Stolarz et al. | |
| 8,733,784 B2 | 5/2014 | Kobayashi | |
| 8,764,048 B1 | 7/2014 | Ahnert et al. | |
| 8,844,964 B2 * | 9/2014 | Chiang | B62B 7/14 |
| | | | 280/658 |
| 8,882,134 B2 | 11/2014 | Rolicki et al. | |
| 8,905,427 B2 | 12/2014 | Katz et al. | |
| 8,936,261 B2 | 1/2015 | Yuan | |
| 9,004,524 B1 | 4/2015 | Gower et al. | |
| 9,010,773 B2 | 4/2015 | Horst et al. | |
| 9,108,654 B2 | 8/2015 | Kozinski | |
| 9,108,659 B2 | 8/2015 | Sparling | |
| 9,119,483 B1 | 9/2015 | Heisey | |
| 9,199,659 B2 | 12/2015 | Chen et al. | |
| 9,200,746 B2 | 12/2015 | Xiao | |
| 9,227,650 B2 | 1/2016 | Gillett | |
| 9,242,665 B2 | 1/2016 | Offord | |
| 9,260,127 B2 | 2/2016 | Rolicki et al. | |
| 9,260,128 B2 | 2/2016 | Liu | |
| 9,493,178 B2 | 11/2016 | Smith et al. | |
| 9,511,789 B2 | 12/2016 | Cheng et al. | |
| 9,517,787 B2 | 12/2016 | Zehfuss et al. | |
| 9,545,940 B2 | 1/2017 | Taylor et al. | |
| 9,561,817 B2 | 2/2017 | Laffan et al. | |
| 9,643,640 B2 | 5/2017 | Gower et al. | |
| 9,701,333 B2 | 7/2017 | Liu | |
| 9,725,106 B2 | 8/2017 | Pos | |
| 9,771,095 B2 | 9/2017 | Laffan et al. | |
| 9,776,652 B2 | 10/2017 | Zhong | |
| 9,840,168 B2 | 12/2017 | Yi et al. | |
| 9,849,903 B1 | 12/2017 | Lai | |
| 9,884,640 B2 | 2/2018 | Li | |
| 9,924,806 B2 | 3/2018 | Panello et al. | |
| 9,944,305 B2 | 4/2018 | Lee et al. | |
| 9,956,979 B1 | 5/2018 | Fernsten | |
| 10,023,218 B2 | 7/2018 | Paxton et al. | |
| 10,207,731 B2 | 2/2019 | Taylor et al. | |
| 10,293,843 B2 | 5/2019 | Naslain | |
| 10,321,770 B2 | 6/2019 | Pos | |
| 10,435,058 B2 | 10/2019 | Haut et al. | |
| 10,449,987 B2 * | 10/2019 | Gibson | B62B 7/06 |
| 10,556,610 B2 * | 2/2020 | Rolicki | B62B 9/02 |
| 10,836,419 B2 | 11/2020 | Oakes | |
| 10,899,377 B2 * | 1/2021 | Eggert-Crowe | B62B 7/14 |
| 11,091,186 B2 * | 8/2021 | Zhang | B62B 7/062 |
| 11,192,568 B2 | 12/2021 | Lee et al. | |
| 11,203,371 B2 | 12/2021 | Zhong | |

(56) References Cited

U.S. PATENT DOCUMENTS

| | | | |
|---|---|---|---|
| 11,208,135 | B2 | 12/2021 | Haut et al. |
| 11,208,136 | B2 | 12/2021 | Taylor et al. |
| 11,220,282 | B2 | 1/2022 | Chaudeurge |
| 11,225,279 | B2 | 1/2022 | Horst et al. |
| 11,292,499 | B2 | 4/2022 | Rolicki et al. |
| 11,338,836 | B2 | 5/2022 | Perrot |
| 11,370,468 | B2 | 6/2022 | Young et al. |
| 11,505,231 | B1 | 11/2022 | Zehfuss |
| 11,541,924 | B2 | 1/2023 | Yi |
| 11,572,093 | B2 | 2/2023 | Yoo |
| 11,577,771 | B2 | 2/2023 | Zehfuss |
| 11,643,127 | B2 | 5/2023 | Zhang |
| 11,696,649 | B2 | 7/2023 | Zhong |
| 11,731,680 | B2 | 8/2023 | Taylor et al. |
| 11,731,681 | B2 | 8/2023 | Eggert-Crowe et al. |
| 11,793,325 | B2 | 10/2023 | Zhong |
| 12,005,950 | B2 * | 6/2024 | Zhong .................... B62B 9/102 |
| 12,037,039 | B2 * | 7/2024 | Yi ............................ B62B 7/04 |
| 2001/0033069 | A1 | 10/2001 | Ivers |
| 2002/0109321 | A1 | 8/2002 | Turner et al. |
| 2003/0025304 | A1 | 2/2003 | Haeggberg |
| 2006/0001226 | A1 | 1/2006 | Refsum |
| 2006/0131841 | A1 | 6/2006 | Huang |
| 2006/0290107 | A1 | 12/2006 | Powers |
| 2007/0001429 | A1 | 1/2007 | Maciejczyk |
| 2007/0085303 | A1 | 4/2007 | Cheng |
| 2007/0090619 | A1 | 4/2007 | Lundh |
| 2007/0114738 | A1 | 5/2007 | Jones et al. |
| 2008/0224451 | A1 | 9/2008 | Vegt |
| 2008/0231022 | A1 | 9/2008 | Hu et al. |
| 2009/0302578 | A1 | 12/2009 | White et al. |
| 2010/0140902 | A1 | 6/2010 | Zehfuss |
| 2014/0191483 | A1 | 7/2014 | Rolicki et al. |
| 2014/0333039 | A1 | 11/2014 | Zehfuss |
| 2016/0046315 | A1 | 2/2016 | Zehfuss et al. |
| 2022/0371643 | A1 | 11/2022 | Hu |
| 2022/0410959 | A1 | 12/2022 | Flessa et al. |
| 2023/0125708 | A1 | 4/2023 | Hu |
| 2023/0219611 | A1 | 7/2023 | Taylor et al. |

FOREIGN PATENT DOCUMENTS

| | | |
|---|---|---|
| CN | 2918181 Y | 7/2007 |
| CN | 201626448 U | 11/2010 |
| CN | 201646823 U | 11/2010 |
| CN | 102256856 A | 11/2011 |
| CN | 103909960 A | 7/2014 |
| CN | 103921830 A | 7/2014 |
| CN | 107082083 A | 8/2017 |
| CN | 106184331 B | 7/2018 |
| CN | 108327769 A | 7/2018 |
| CN | 108674478 A | 10/2018 |
| CN | 113135216 A | 7/2021 |
| CN | 114475760 A | 5/2022 |
| CN | 113511252 B | 10/2022 |
| CN | 113715891 B | 1/2023 |
| CN | 108909813 B | 7/2023 |
| DE | 102020132658 A1 | 6/2021 |
| EP | 1992543 B1 | 8/2010 |
| EP | 3708461 B1 | 6/2023 |
| EP | 4212408 A1 | 7/2023 |
| ES | 2253093 A1 | 5/2006 |
| GB | 2309203 A | 7/1997 |
| GB | 2544377 B | 3/2021 |
| WO | 2005105545 A1 | 11/2005 |
| WO | 2005105546 A1 | 11/2005 |
| WO | 2010065884 A1 | 6/2010 |
| WO | 2014042524 A1 | 3/2014 |
| WO | 2023105066 A1 | 6/2023 |

OTHER PUBLICATIONS

International Search Report and Written Opinion for International Application No. PCT/US2009/066817, dated Jan. 29, 2010 (6 pages).

International Preliminary Report on Patentability for International Application No. PCT/US2009/066817, dated Jun. 7, 2011 (5 pages).

Office Action from Australian Patent Application 2009322149, dated Apr. 1, 2014 (5 pages).

Office Action from Australian Patent Application No. 2009322149, dated Dec. 2, 2014 (4 pages).

Office Action from Canadian Patent Application No. 2,745,914, dated Dec. 17, 2015 (3 pages).

Office Action from Chinese Patent Application No. 200980148829.3 dated Oct. 31, 2012 (17 pages, including 8 pages English translation).

Office Action from Chinese Patent Application No. 200980148829.3, dated Jun. 8, 2013 (11 pages, including, 5 pages English translation).

Office Action from Chinese Patent Application No. 200980148829.3, dated Nov. 18, 2013 (5 pages, including 2 pages English translation).

Office Action from Chinese Patent Application No. 201410187239.4, dated Sep. 6, 2015 (9 pages, including 4 pages English translation).

Office Action from European Patent Application No. 09831215, dated Jan. 13, 2016 (5 pages).

Office Action issued in Chinese Application No. 201710169826.4, dated Oct. 31, 2018, (11 pages).

\* cited by examiner

REMOVABLE SEAT ATTACHMENT FOR A STROLLER

RELATED APPLICATIONS

This application is a continuation of U.S. patent application Ser. No. 16/903,292, filed Jun. 16, 2020, which is a continuation of U.S. patent application Ser. No. 15/912,901, filed Mar. 6, 2018, issued as U.S. Pat. No. 10,730,543, which is a continuation of Ser. No. 15/225,326, filed Aug. 1, 2016, issued as U.S. Pat. No. 9,944,305, which claims the benefit of U.S. Application No. 62/311,224 filed Mar. 21, 2016, and is a continuation-in-part of U.S. patent application Ser. No. 14/597,420, filed Jan. 15, 2015, issued as U.S. Pat. No. 9,403,550, which is a continuation of U.S. patent application Ser. No. 14/261,558, filed on Apr. 25, 2014, issued as U.S. Pat. No. 8,955,869, which is a continuation of U.S. application Ser. No. 12/631,375 filed Dec. 4, 2009, which claims the benefit of U.S. Application No. 61/119,920, filed Dec. 4, 2008, the contents of which are all incorporated by reference.

TECHNICAL FIELD

Embodiments disclosed herein are generally related to children's stroller systems and more particularly to apparatuses and methods for a removable seat attachment for a stroller that is capable of supporting a seat including, but not limited to, a stroller seat, a baby seat, a bassinet, a pram, a car seat, or a baby carrier.

BACKGROUND

Parents or guardians with multiple young children may have difficulty transporting their children from place to place. Children are slow, easily distracted and, therefore, may lag behind. In response, many parents and/or guardians have purchased double seat strollers allowing the parent or guardian to push two children simultaneously and thus allow them to more efficiently run errands, take walks, or jog. As such, a double seat stroller allows the parent or guardian with multiple young children more freedom than they would have with only a single seat stroller.

However, permanently fixed double seat strollers also have certain disadvantages. Double seat strollers are substantially larger (wider and/or longer) than single seat strollers and are, therefore, more difficult to maneuver through doorways and down aisles in stores. While, the benefits of being able to accommodate two children at one time in a double seat stroller typically offset these disadvantages, when the parent or guardian has only one child with them, the benefits of the double seat stroller are not realized but the disadvantages still exist.

Stroller manufacturers have attempted to solve this problem by providing an adjustable stroller that can be modified from having a single seat to having two seats by providing attachments that provide a second seat for the second child that hangs under and slightly behind the seat of the single seat stroller. In other embodiments, the second seat can be attached to a seat attachment placed further forward in the stroller. The current attachment mechanisms can suffer from several drawbacks. These drawbacks include being permanently affixed to the stroller frame and taking up unnecessary space or creating a safety hazard for children not in the stroller when the second seat is not attached to the stroller. In addition, the covers for the seat attachments, for covering a portion of the seat attachment mechanism when not in use, are detachable and can be easily lost when the seat attachment is in use.

BRIEF DESCRIPTION OF THE EXAMPLE DRAWINGS

For a more complete understanding of the present disclosure and certain features thereof, reference is now made to the following description, in conjunction with the accompanying figures briefly described as follows:

FIG. 1 presents a side elevation view of a single stroller apparatus according to one example embodiment of the disclosure.

FIG. 2 presents a partial side elevation view of a seat attachment to convert a single stroller into a double stroller according to one example embodiment of the disclosure.

FIG. 3 presents a side elevation view of a combination of the single stroller of FIG. 1 attached to the seat attachment of FIG. 2 according to one example embodiment of the disclosure.

FIG. 4 presents a perspective view of a seat attachment capable of supporting a car seat on an attachment of FIG. 2 according to one example embodiment of the disclosure.

FIG. 5 presents a side elevation view of a combination of the single stroller of FIG. 1 attached to an attachment in the form of a tricycle-like riding device according to one example embodiment of the disclosure.

FIG. 6A presents a view of an accessory attachment for supporting an accessory on a stroller.

FIG. 6B presents a view of a bag or purse for attaching to the accessory attachment of FIG. 6A according to one example embodiment of the disclosure.

FIG. 7 presents a perspective view of an attachment for supporting a seat comprising one wheel according to one example embodiment of the disclosure.

FIGS. 8A-H present multiple views of a stroller apparatus capable of being converted from a single seat stroller to a double seat stroller through the use of removable seat attachment adapters according to one example embodiment of the disclosure.

FIG. 9 presents a perspective view of one version of a stroller with left and right attachment frame members for attaching a second seat according to one example embodiment of the disclosure.

FIG. 10 presents a front elevation view of an attachment frame member according to one example embodiment of the disclosure.

Figure 13A:
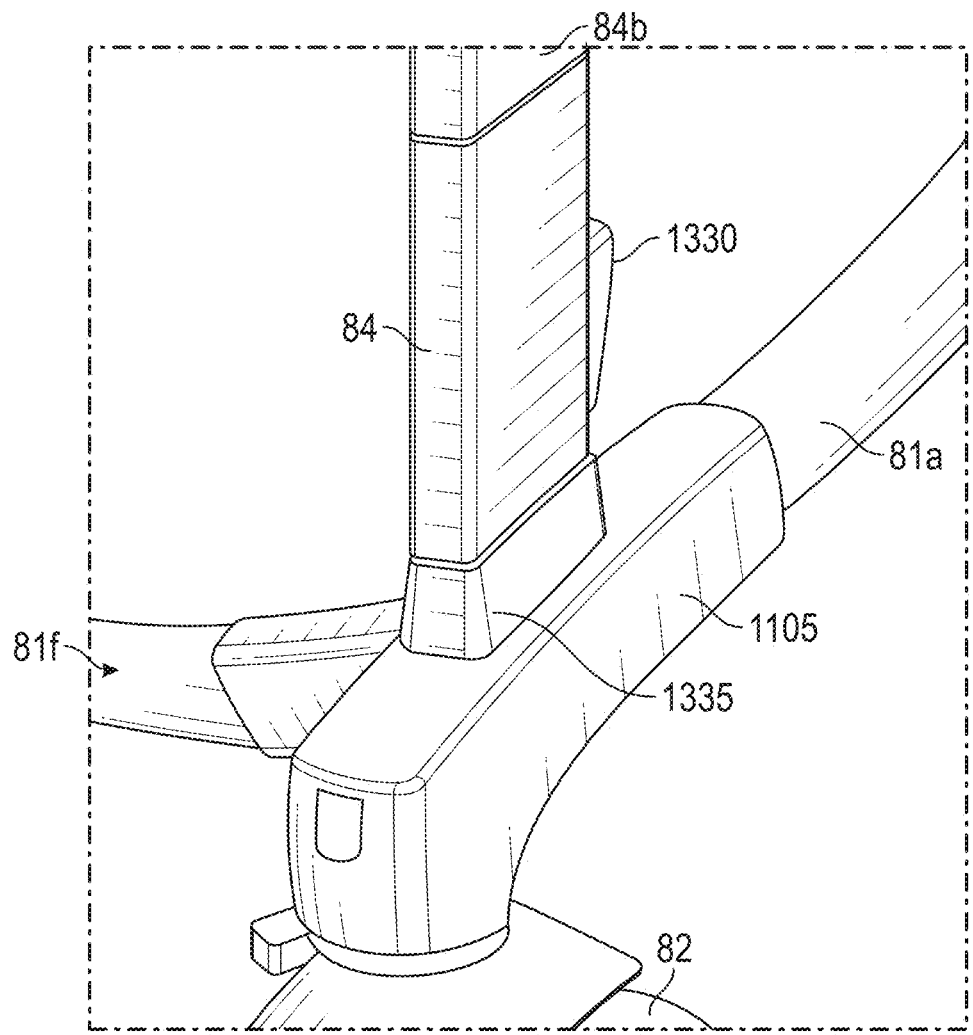
Figure 13B:
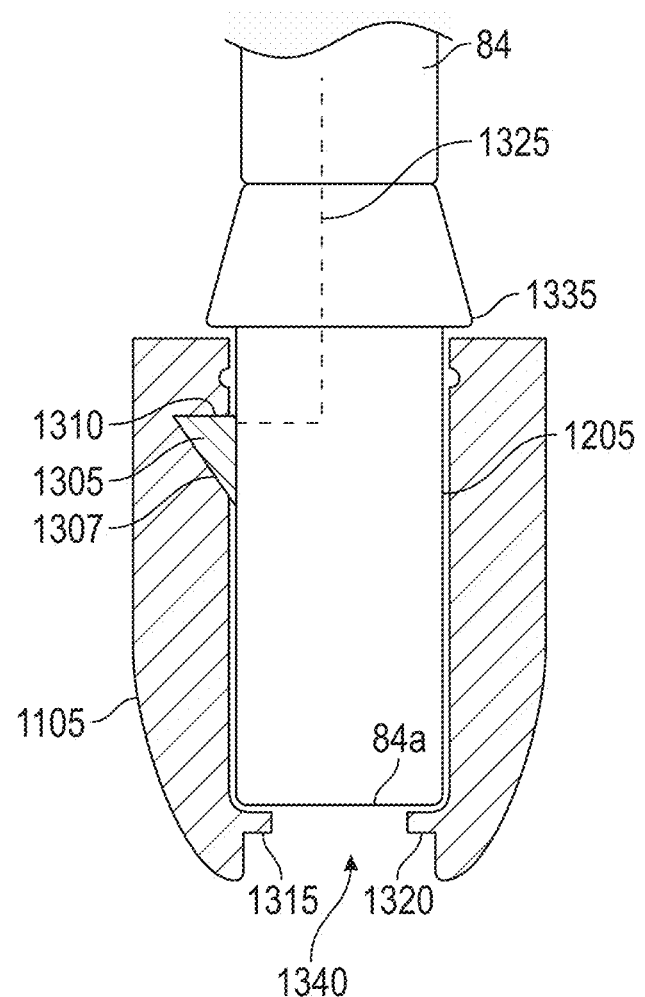
Figure 13C:
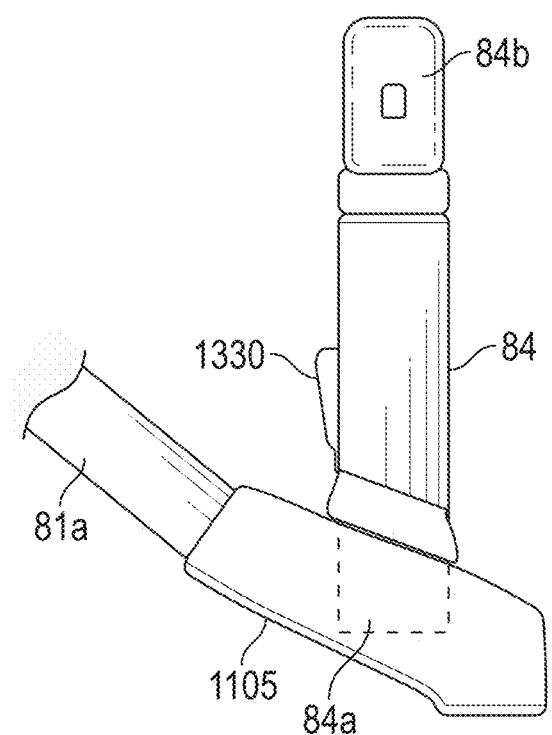

FIG. 13A-C are partial perspective views of the removable seat attachment adapter removably coupled to the seat attachment housing according to one example embodiment of the disclosure.

Figure 14A:
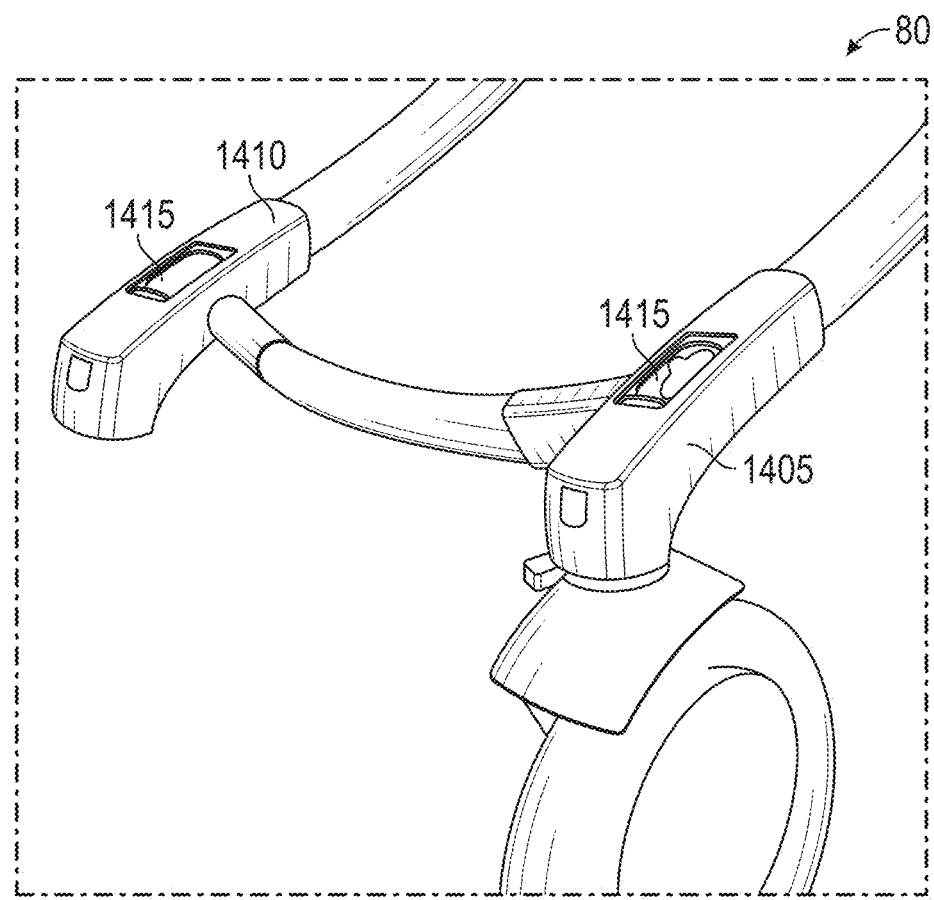
Figure 14B:
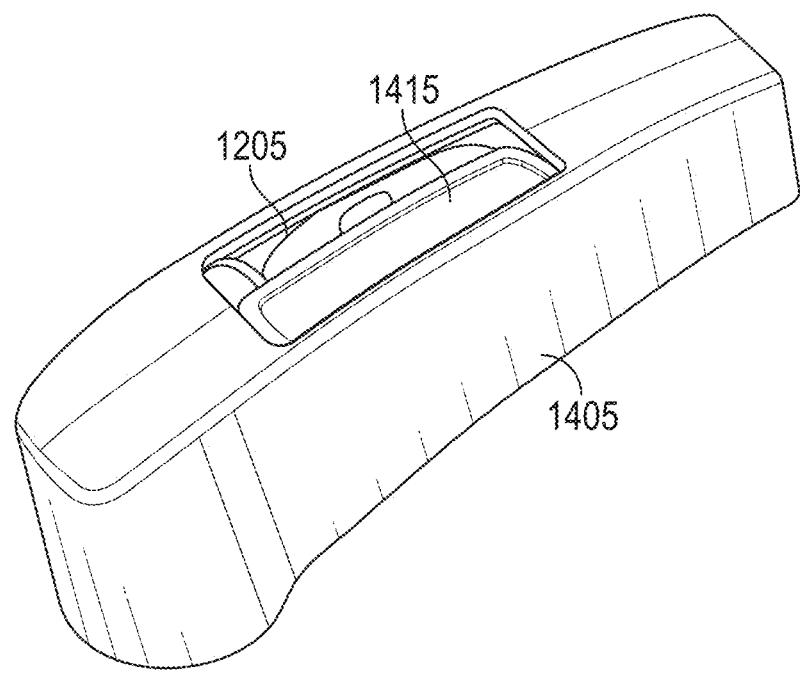
Figure 14C:
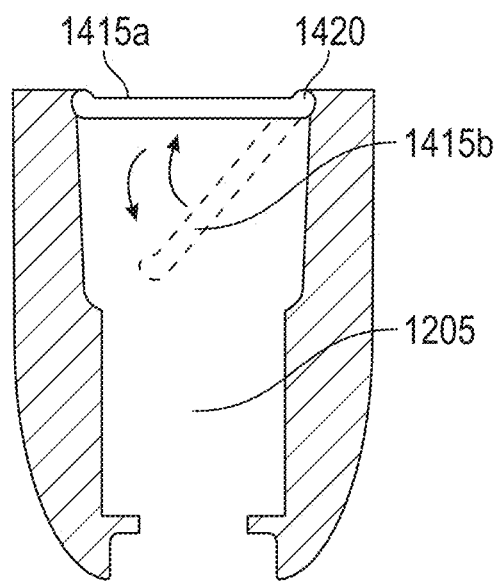

FIG. 14A-C are partial perspective views of an alternative embodiment of the seat attachment housing according to another example embodiment of the disclosure.

DETAILED DESCRIPTION OF THE EXAMPLE EMBODIMENTS

Example embodiments of the invention now will be described more fully hereinafter with reference to the accompanying drawings, in which example embodiments are shown. The concept disclosed herein may, however, be embodied in many different forms and should not be construed as limited to the exemplary embodiments set forth herein; rather, these embodiments are provided so that this disclosure will be thorough and complete, and will fully convey the scope of the invention to those skilled in the art. Like numbers refer to like, but not necessarily the same, elements throughout.

The example embodiments described herein and shown in the figures is described with reference to an infant or child's stroller that can be configured to adjust from a single seat stroller to a multi-seat stroller. While the example embodiments will generally be described with reference to adding or removing seats from the stroller, the reference to seats is for example purposes only, as the seat or portion that can be added or removed from the stroller can include, but is not limited to, a stroller seat, a baby seat, a bassinet, a pram, a car seat, or a baby carrier. Each of the stroller seat, baby seat, bassinet, pram, car seat, and/or baby carrier should individually be read as an alternative embodiment to the removable/added infant or child's stroller seat described below.

Certain dimensions and features of the example adjustable stroller are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships between dimensions of the adjustable stroller and between features of the adjustable stroller are described herein using the term "substantially." As used herein, the terms "substantially" and "substantially equal" indicates that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations therefrom.

As discussed above, parents or guardians may find themselves in a situation wherein it is more convenient to transport two children in a stroller, but at the same time find it inconvenient to have both a single stroller and double stroller. Embodiments of the seat attachment solve this problem. In one aspect, an embodiment of the seat attachment for a stroller is capable of converting a single stroller into a double stroller. The seat attachment may support a seat such as, but not limited to, a stroller seat, a baby seat, a bassinet, a pram, a baby carrier, or a car seat, for example. Therefore, the parent or guardian does not require both a single stroller and a double stroller. A stroller configured to receive a seat attachment for converting a single stroller into a double stroller provides convenience to the user. The single stroller may be connected to a double stroller by attaching the seat attachment to the single stroller and then attaching the second seat. As such, an embodiment of the seat attachment for converting a single stroller into a double stroller can include at least one connector portion capable of connecting to a stroller frame and a seat support element capable of supporting a seat.

Figure 1:
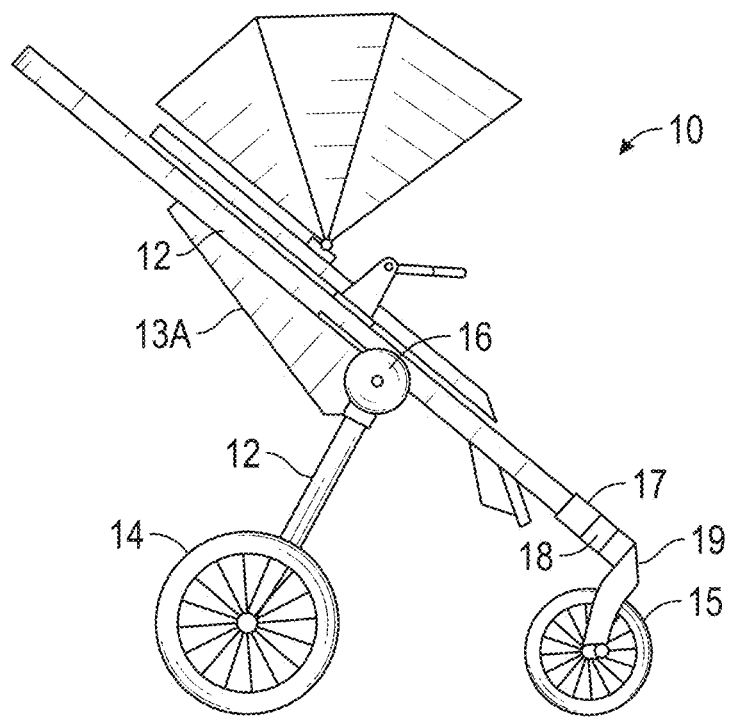

FIG. 1 presents a side elevation view of a single stroller apparatus 10 according to one example embodiment of the disclosure. Referring to FIG. 1, it shows only one side of the single stroller 10, however, most components include a complementary component on the other side of the single stroller but are not shown in FIG. 1. The example single stroller 10 includes a frame 12 that supports a seat 13. The frame 12 may optionally include at least one, and in certain embodiments preferably two, folding mechanisms 16 that allow the stroller 10 to be folded to a more convenient size for storing or transporting the stroller 10.

In the example embodiment of FIG. 1, the seat 13 is shown as a typical stroller seat. However, other types of seats may be used in a single stroller. The seat 13 may be permanently affixed to the frame 12 or releasably connected, such that it is capable of being removed and substituted with a different seat. As used herein, "releasably connected" or "releasably attached" means the connection is not a permanent connection and that the connection is capable of being connected and disconnected by the user of the stroller 10 without requiring special tools or special skills. Releasably connections include, but are not limited to, buttons, snaps, friction fittings, interference fits, threaded connections, locking tabs, keyed connections, other fasteners, or the like. The frame 12 is supported on a pair of back wheels 14 and a pair of front wheels 15. In this example embodiment, the back wheels 14 are fixed and do not swivel or pivot on the frame 12 while the pair of front wheels 15 pivot to make turning the single stroller 10 easier and more convenient. Though, pivoting wheels may be preferred in certain strollers, strollers with fixed non-pivoting wheels are also common and considered as an option as part of this disclosure. In certain example embodiments, the single stroller 10 does not require pairs of front 15 or rear 14 wheels and either the front pair of wheels 15 or the back pair of wheels 14 may be substituted with a single wheel. In certain example embodiments, the single stroller 10, including umbrella strollers, jogging strollers, all-terrain strollers, as well as other strollers may only include one front wheel 15.

Figure 3:
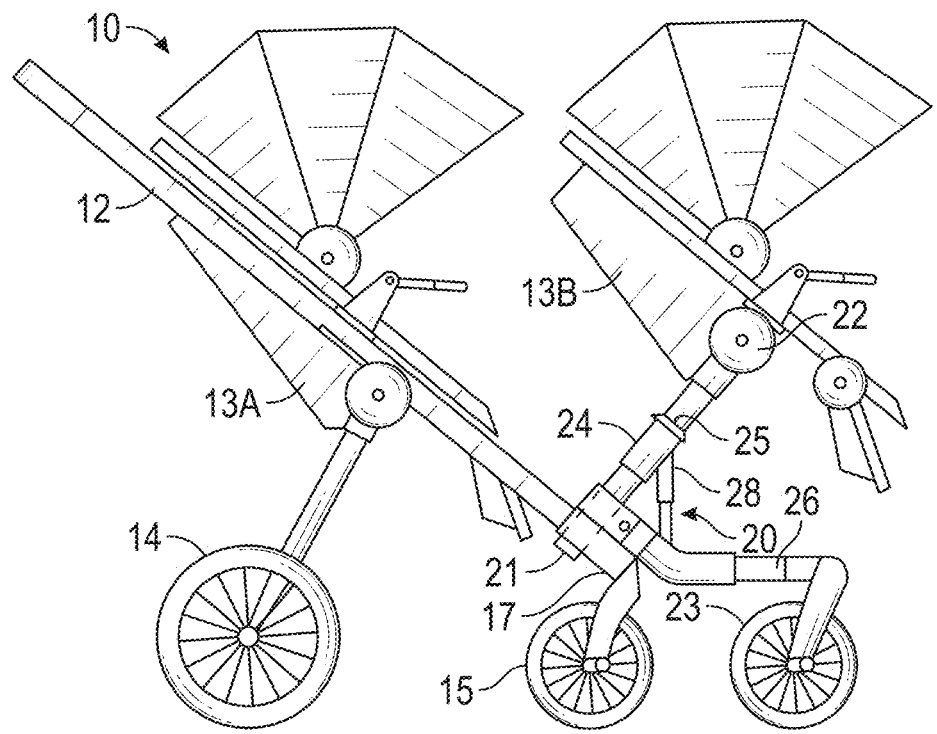

The example single stroller 10 may also include one or more seat attachments that are capable of converting any style of single stroller to a double stroller, including strollers with one or two front wheels. In one example embodiment, the stroller 10 can include two attachment portions 17. In one example, the attachment portions 17 can be positioned on or near the front of the stroller 10 to allow the seat attachment and the seat to be connected to the front portion of the stroller 10. The attachment portions 17 can allow a seat attachment such as the seat attachment for converting the single stroller 10 to a double stroller, as shown in FIG. 3, to be connected to the stroller. While only one seat attachment is shown in FIG. 3, the stroller 10 could typically include two seat attachments as shown in FIG. 3 or one seat attachment that can include two seat support elements. In certain example embodiments, the stroller 10 can include a left side and a right side attachment portion 17. The seat attachment for the stroller 10 can further include corresponding connector portions capable of connecting to the stroller frame at the attachment portions 17. Though the seat attachment for the stroller is described in relation to a single stroller, the attachment may similarly be attached to a double stroller. As such, example embodiments of the seat attachment may therefore be used to convert a double stroller into a triple stroller, if desired.

Figure 2:
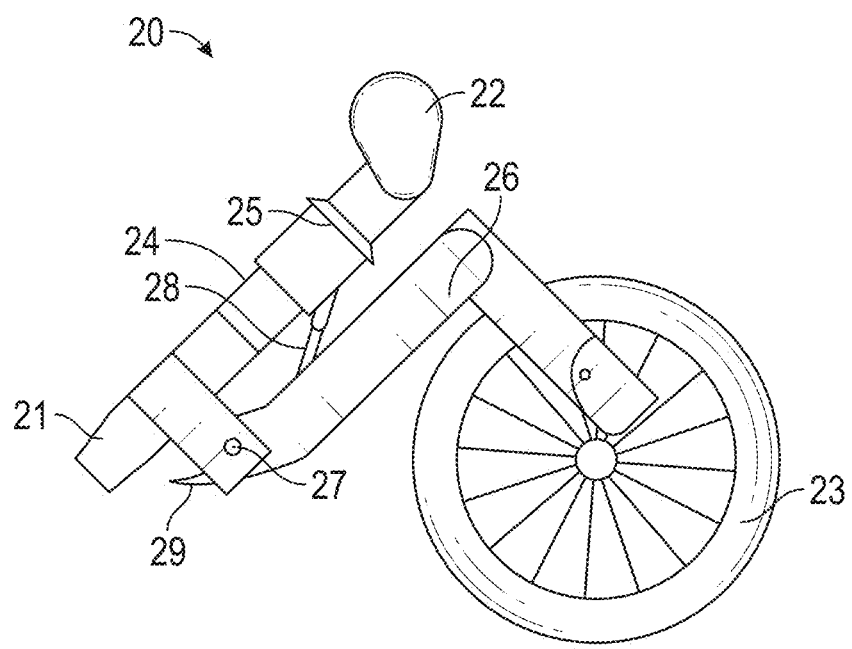

FIG. 2 presents a partial side elevation view of a seat attachment to convert a single stroller into a double stroller according to one example embodiment of the disclosure. Now referring to FIGS. 1 and 2, the example seat attachment 20 is shown in an unlocked and folded configuration. The seat attachment 20 includes a one or more connector portions 21 capable of connecting to the attachment frame members 24, two seat attachment elements 22 capable of supporting a seat; and a wheel 23. In this example embodiment, the connector portions 21 are connected to the rear of the seat attachment 20 allowing the seat attachment 20 to be connected to the front of a stroller, such as stroller 10 shown in FIG. 1. In other example embodiments, the seat attachment 20 may include more than one wheel 23, one connector portion 21, one seat support element, or combinations of these elements. In example embodiments of the stroller with one wheel, the attachment frame member may be on the forks of the front wheel, for example.

The seat attachment 20 can include a wheel support frame 26 connecting the wheel 23 to the attachment frame member 24 of the attachment 20. Each attachment frame member 24 has a first and a second end. The first end is capable of connecting to a stroller frame and the second end can be connected to the seat support element 22. As shown in FIG. 2, the seat attachment 20 can include a wheel support frame 26 that is pivotally connected to two attachment frame members 24. The wheel support frame 26 or the attachment frame 24 may span the width of the stroller between the two attachment portions 17. The pivotal connection 27 allows the seat attachment 20 to be folded and conveniently stored or transported but is not necessary for all example embodiments of the disclosure. The pivotal connection 27 can be optional and provide more convenience, however, other example embodiments of the seat attachment 20 can include a releasably connected wheel support frame or a rigid frame that may be incorporated to produce a seat attachment that has greater strength for use in situations where a stronger seat attachment may be desired, such as with all-terrain or jogging strollers, for example. The wheel support frame 26 may be connected at any point on the attachment frame 24. In certain example embodiments the wheel support frame 26 is connected to the attachment frame 24 near the connector portion 21 or near the middle of the attachment frame 24.

In certain example embodiments, the seat attachment without a wheel may include connector portion 21 or attachment frame member 24, and seat attachment member 22, for example. In this example embodiment, there may be no need for the pivotal connection 27, wheel support frame 26, sliding connector 25, or wheel 23.

The seat attachment 20 can also include a folding mechanism that includes a sliding connector 25 connected to a first end of a strut 28. A second end of the strut 28 can be pivotally connected to wheel support frame 26. In such an embodiment, the sliding connector 25 may be moved between a first position and a second position on the attachment frame member 24. As the sliding connector 25 is moved, the strut 28 pushes the wheel support frame 26 from an in-use position to a storage position. The storage position is more compact as shown in FIG. 2. In addition, certain example embodiments of the seat attachment 20 can also include a locking mechanism 29 that is capable of securing the seat attachment 20 to a stroller, such as stroller 10 shown in FIG. 1. The locking mechanism 29 can be engaged by moving the sliding connector 25 to the in-use position, in which the wheel support frame 26 and wheel 23 are extended. In certain example embodiments, the wheel 23 of the seat attachment 20 is pivotally connected to the connector portion 21 and when the wheel 23 is in the in-use position the releasably connection is locked and when the wheel 23 is moved to the storage position, the releasably connection is unlocked allowing the seat attachment 20 to be removed from stroller 10. The seat attachment 20 may be stored and the stroller 10 may be conveniently used as a single stroller. As designed, the seat attachment 20 may be reconnected to the stroller 10 for use as a double stroller when needed. The seat attachment portion may be secured into position on the stroller frame and a locking mechanism may be used with an embodiment with or without the wheel. Either the seat attachment or the stroller frame can include a locking mechanism for securing the stroller and seat attachment together. The locking mechanism may be any mechanism capable of securing the components together during use and may be a friction locking device, threaded connection, peg in a hole, or an interference locking device such as a pin in a hole, for example. As shown in the example embodiment of FIG. 2, the locking mechanism 29 pivots with wheel support frame 26 as the seat attachment 20 is moved from an unfolded position to a folded position. The locking mechanism 29 may slide into a hole or notch in the attachment frame member 24 of the stroller 10 shown in FIG. 1. As such, the seat attachment 20 may be attached to the stroller 10 by positioning the attachment (connector) portion 21 of the seat attachment 20 in the slot 18 of the attachment portion 17 of the stroller 10. The sliding connector 25 may be moved to the in-use position, the wheel support frame is moved, and the locking mechanism 29 is positioned into the locking slot 19 of the stroller 10.

In certain example embodiments, the connector portion 21 of the seat attachment 20 has a cylindrical or substantially cylindrical shape. The connector portion 21 may be inserted into a cylindrical or substantially cylindrical slot 18 of the attachment portion 17 of the stroller 10 of FIG. 1 to secure the seat attachment and convert the single stroller into a double stroller, as shown in FIG. 3. In other example embodiments, the seat attachment 20 may include any type of connector portion having any geometric or non-geometric shape. The connector portion 21 may be of a solid or tubular construction and may be any cross-sectional shape including, but not limited to, circular, polygonal, square, rectangular, and triangular, for example. Other attachment mechanisms may be utilized to connect the seat attachment to the stroller 10 such as, but not limited to, a U-shaped bracket, a U-bolt, a pipe clamp, O-shaped bracket, screw, bolt, or other clamping or attachment means. The attachment frame member 24 of the stroller 10 can have a complimentary and/or cooperating shape that allows the connector portion 21 to be secured to the attachment portion of the stroller.

FIG. 3 presents a side elevation view of a combination of the single stroller 10 of FIG. 1 attached to the seat attachment 20 of FIG. 2 according to one example embodiment of the disclosure. Referring to FIG. 3, the seat attachment 20 removably coupled to the single stroller 10 to form a double stroller. The double stroller configuration is shown with two stroller seats 13 in an inline configuration, though the other configurations, such as a stroller seat and a bassinet or a pram may also be supported on the double stroller. Further, the seat support element 22 of the seat attachment 20 may be capable of supporting the front stroller seat 13 in either a forward-facing or backward-facing position.

The example embodiment of the stroller 10 in FIG. 3 is shown only as an example of one type of stroller, the frame of the stroller 10 may be any of many possible configurations. Example embodiments of the seat attachment accessory may be configured to be used on any such configuration of a stroller. For example, in another example embodiment, the baby stroller may not include two front wheels, may not include a folding mechanism or may include only one folding mechanism. In addition, the baby stroller may include additional features not included in baby stroller 10. For example, the stroller may optionally include fixed front wheels, an entirely different frame configuration, or a storage basket underneath the seat of the stroller.

Figure 4:
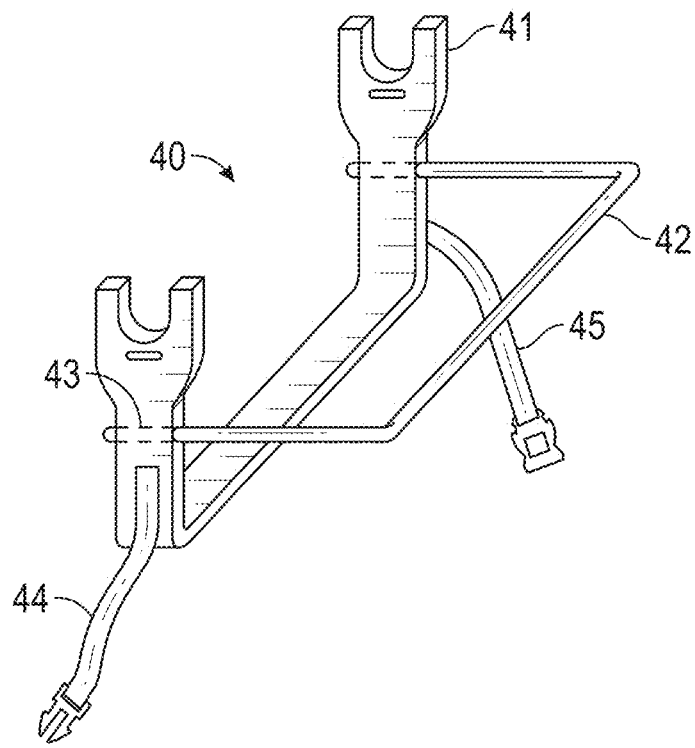

The seat support member may be any configuration capable of supporting the seat on the seat attachment 20. FIG. 4 presents another example embodiment of a seat support member 40 for use with a car seat or other baby seat according to one example embodiment of the disclosure. Now referring to FIG. 4, the seat support member 40 can include a main support 41. The main support 41 can include a cradle for supporting a central portion of the seat. Another portion of the seat may rest against support bar 42. In this example, the support bar 42 may be adjusted to accommodate seats of different shapes and sizes. The support bar 42 may be slid within the aperture 43 and locked in place when the support bar 42 is in the desired position to support a certain seat. The seat is, therefore, supported on two main supports 41 and the support bar 42. The seat may be further secured in the seat attachment member 40 by wrapping belts 44 and 45 around the seat and locking the belts in this position with a buckle or other securing means.

Figure 5:
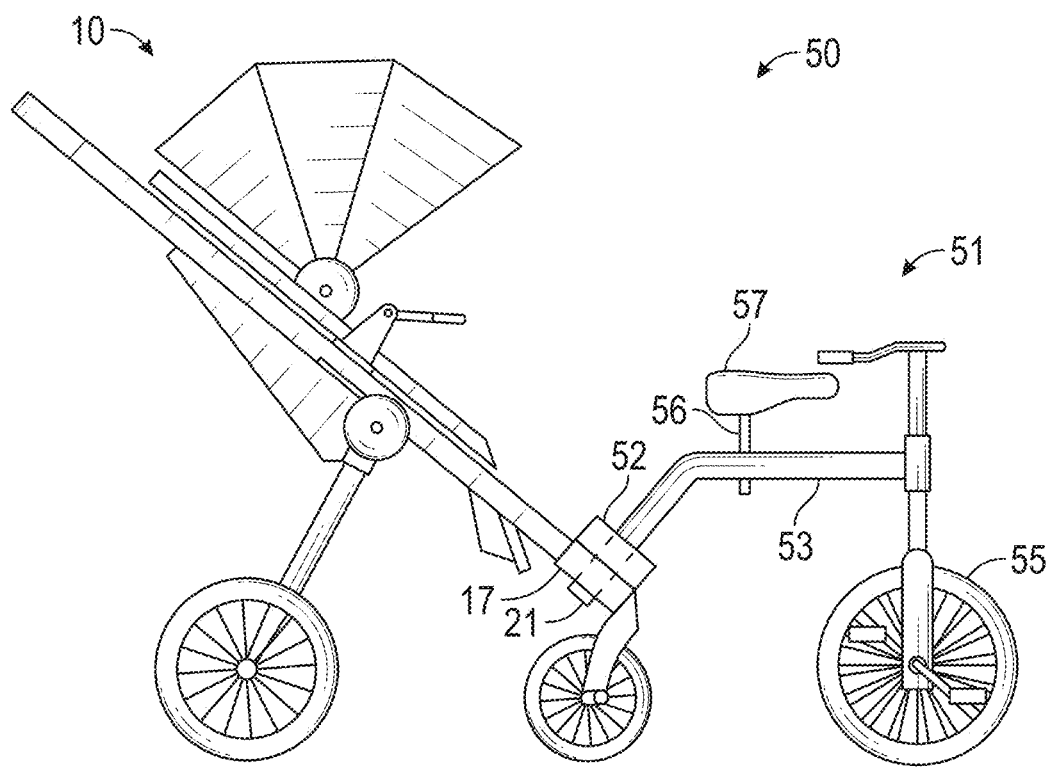

FIG. 5 presents a side elevation view of a combination 50 of the single stroller 10 of FIG. 1 attached to an attachment in the form of a tricycle-like riding device according to one example embodiment of the disclosure. Referring to FIG. 5, the combination 50 includes the stroller 10 and the seat attachment 51. In one example, the seat attachment 51 is a tricycle-like attachment that includes a connector portion 52, a frame 53 with a seat support element 56, a seat 57, and a wheel 55. The tricycle-like attachment may be attached to stroller 10 to allow one child to be pushed in the stroller 10 and one child to ride the seat attachment 51. The seat attachment 51 may be other shapes also such as cars, trucks, or animal shapes, for example.

In certain example embodiments, the stroller 10 can include an additional accessory attachment portion 58. The accessory attachment portion 58 attaches to a frame member of the stroller 10. An embodiment of the accessory attachment portion 58 is shown on FIG. 6A. This embodiment is particularly useful for attaching a bag or purse 64, as shown in FIG. 6B, to the stroller 10.

Figure 6A:
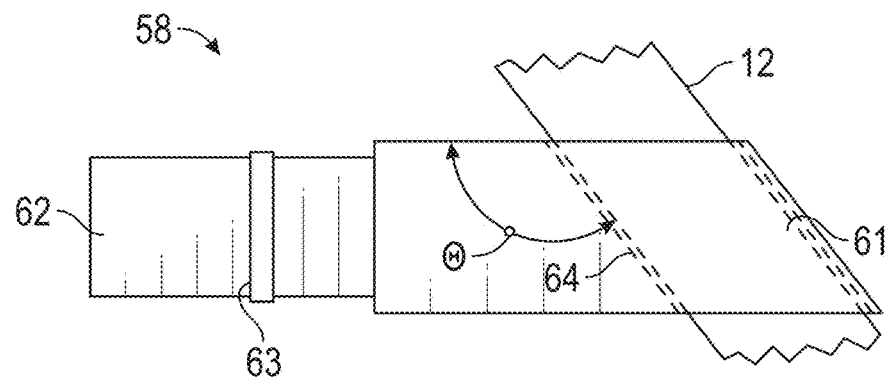

When using a stroller, parents or guardians typically carry other items, such as purses, grocery bags, cell phones, diapers, cleaning wipes, or other personal or baby related items. Some strollers have bottom storage baskets for placing such items. However, these storage baskets can be inconvenient to access or some light weight strollers do not include such storage baskets. Therefore, users of the stroller may hang purses or shopping bags on the handle of the stroller. This is convenient in that the bag is easy to access, but the weight of the bag on the handle may cause the stroller to be unbalanced and increase the tendency of the stroller to topple backwards. A heavy bag hung from the handle of a stroller may cause the stroller to tip backwards even with a child in the seat. The problem is worse if the stroller is facing uphill, on uneven terrain, being pushed up a curb, or occupied by a small child. The accessory attachment 58 may be attached to the frame of the stroller 10 by any of the clamping or attachment methods described above, for example. Preferably, the accessory attachment 58 is attached near the center of gravity of the stroller 10 to avoid creating an unbalanced condition of the stroller 10. As shown in FIG. 6A, the accessory attachment 58 is connected to stroller frame 12 of stroller 10 near the folding mechanism. Certain example embodiments of the accessory attachment 58 include a first end 61 for connecting to a stroller frame and a distal second end 62 for releasably connecting to the accessory 64. The first end 61 can include an aperture 64 that may be connected to frame 12 of the stroller 10. In certain example embodiments, the aperture 64 is on an angle, such that when the axis of the accessory attachment portion 58 is horizontal or substantially horizontal. The accessory attachment 58 may, optionally, include a rib 63 for securing the accessory 64 to the accessory attachment 58. The rib 63 may be replaced with any other locking element or securing means including a friction fitting, a screwed fitting, or interference fitting, for example.

Figure 6B:
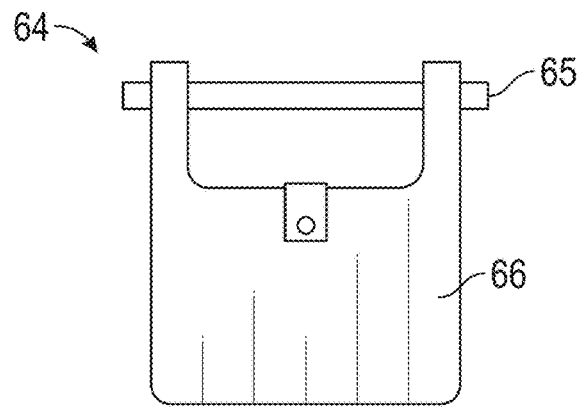

One example of an accessory 64 for attaching to an accessory attachment 58 is shown in FIG. 6B. The accessory 64 in this example is a bag or purse. The accessory 64 can include an attachment portion 65 that is capable of being secured to the attachment portion 62 on the accessory attachment 58. The accessory 64 may be secured on stroller 10 by securing attachment portion 65 to attachment portion 62. The attachment portion 65 can slide over the cylindrical attachment portion 62 of accessory attachment 58. The attachment portion 65 may include an interior annular recess that receives the rib 63 securing the accessory 58 to the stroller 10. The accessory 64 is thus removably coupled to the stroller 10 in a center portion of the stroller as viewed from the side. Therefore, the bag or purse 64 is conveniently secured to stroller 10 while not contributing to an unbalanced condition of the stroller 10.

Figure 7:
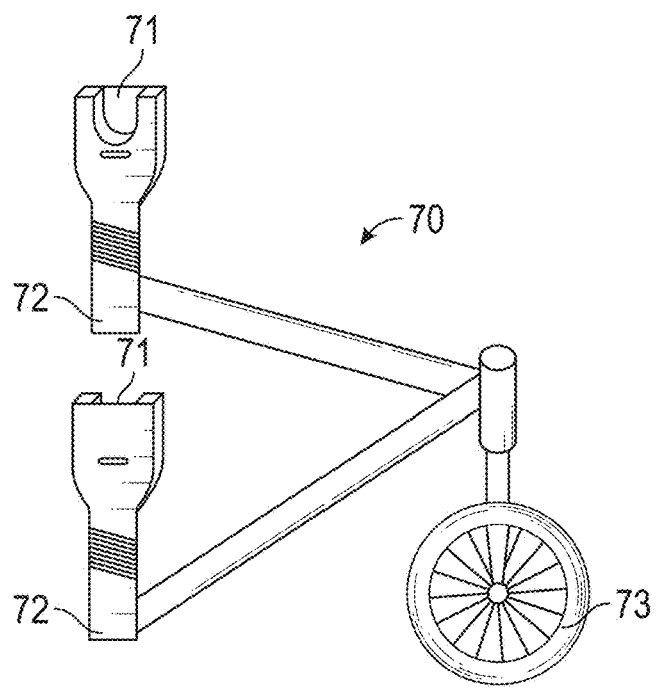

FIG. 7 presents a perspective view of an attachment 70 for supporting a seat comprising one wheel 73 according to one example embodiment of the disclosure. Referring now to FIG. 7, the example seat attachment 70 can include two seat attachment members 71, two connector portions 72, and a wheel 73. The two seat attachment members 71 and the wheel 73 can be disposed or otherwise positioned in a triangular relationship. In certain example embodiments, the wheel 73 provides additional stability to a stroller 10 connected to the seat attachment 70 if a heavier child is placed in a seat attached to the seat attachment members 71.

FIGS. 8A-H present multiple views of a stroller apparatus capable of being converted from a single seat stroller to a double seat stroller through the use of removable seat attachment adapters, according to another example embodiment of the disclosure. Referring now to FIGS. 8A-H, the example stroller apparatus 80 can include a stroller frame 81 capable of supporting one or more stroller seats 85, 86. In one example embodiment, the stroller frame 81 can be made of one or more pieces fixedly coupled and/or removably coupled to one another. The stroller frame 81 can include portions that are hollow tubing and other portions that are solid core tubing and can be made from metal, plastic, or other materials known in the art.

Figure 11:
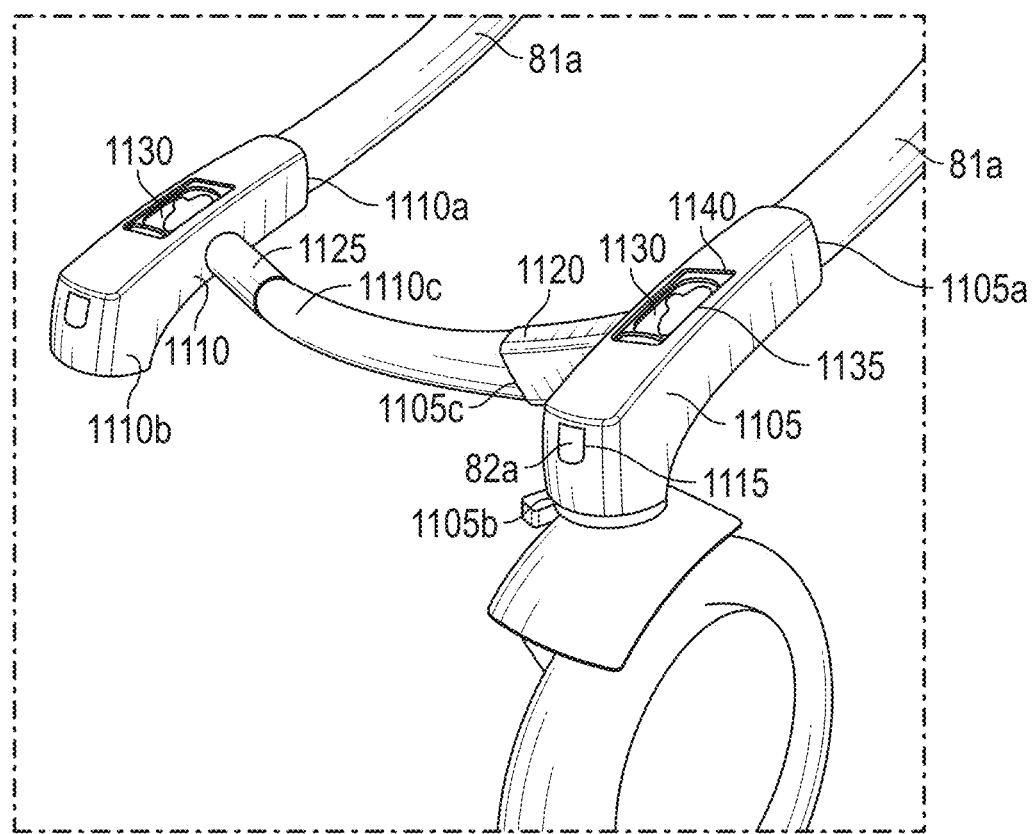
FIG. 11 is a partial perspective view of the stroller showing the seat attachment housing according to one example embodiment of the disclosure.

In one example embodiment, the stroller frame 81 can include a pair of front wheel support frames 81a (only the left front wheel support frame is shown), a pair of back wheel support frames 81b (only the left back wheel support frame is shown), a pair of upper tube support frames 81c (only the left upper tube support frame is shown), a handle portion 81*d* having a first end coupled to the left upper tube support frame 81*c* and a distal second end coupled to the right upper tube support frame 81*c*, and foot rest support frame 81*f* having a first end coupled to the left front wheel support frame 81*a* (either directly or via the first seat attachment housing 1105 discussed below in FIG. 11) and a distal second end coupled to the right front wheel support frame 81*a* (either directly of via the second seat attachment housing 1110 discussed below in FIG. 11). In certain example embodiments, each front wheel support frame 81*a* can be fixedly coupled or rotatably coupled to its corresponding upper tube support frame 81*c*. Further, in certain example embodiments, the left upper tube support frame 81*c*, handle 81*d*, and right upper tube support frame 81*c* can be made from a single unitary piece of material, such as a single piece of bent, hollow-core metal or plastic tubing. Alternatively, each of the left upper tube support frame 81*c*, handle 81*d*, and right upper tube support frame 81*c* can be separate pieces of the same or different material that are coupled to one another.

The exemplary stroller frame 81 can also include a pair of folding mechanisms 81*e* (only the left folding mechanism is shown). In one example, each folding mechanism 81*e* can be coupled, either directly or indirectly to the corresponding front wheel support frame 81*a*, back wheel support frame 81*b*, and upper tube support frame 81*c* on the corresponding side (left and right) of the stroller 80. In certain example embodiments, one or more of the corresponding front wheel support frame 81*a*, back wheel support frame 81*b*, and upper tube support frame 81*c* are rotatably coupled and rotatably adjustable about one or more axes defined through the folding mechanism 81*e*. As such, in certain example embodiments, the folding mechanism 81*e* allows the stroller 80 to be folded into a more compact size for storing or transportation. FIG. 8B shows the stroller 10 in a folded configuration.

The example stroller 80 can also include at least one front wheel 82 coupled directly or indirectly (e.g., via one of the seat attachment housings 1105, 1110, as shown in FIG. 11) to the stroller frame 81. FIG. 8B presents an example embodiment wherein the stroller 80 can include two front wheels 82, one front wheel 82 being coupled to the stroller 80 adjacent the left front wheel support frame 81*a* and the second front wheel 82 being coupled to the stroller 80 adjacent the right front wheel support frame 81*a*. The example stroller 80 can also include at least one rear wheel 83 coupled directly or indirectly to the stroller frame 81 (e.g., a corresponding back wheel support frame 81*b*). FIG. 8B presents an example embodiment wherein the stroller 80 can include two back wheels 83, one back wheel 83 being coupled to the left back wheel support frame 81*b* and the second back wheel 83 coupled to the right back wheel support frame 81*b*.

The stroller 80 can also include a first stroller seat 86 either fixedly or removably coupled to the stroller frame 81. For example, the first stroller seat 86 can include a left connector on the left side of the first stroller seat 86 and a right connector on the right side of the first stroller seat 86 to removably couple and decouple the first stroller seat from the stroller frame 81. In one example, each of the left connector and right connector can be cavities in the first stroller seat 86 and can be configured to receive at least a portion of a corresponding seat attachment adapter (e.g., a bayonet connector) therein. In another example embodiment, the left connector and the right connector can each be tabs or slots that are configured to be coupled to corresponding slots or tabs along the stroller frame 81.

The stroller 80 can also include a removable seat attachment adapter 84 that is removably coupled to the frame 81 such that the seat attachment adapter 84 can be decoupled from the frame 81 and stored when a second stroller seat is not being used with the stroller 80. In one example embodiment, each removable seat attachment adapters can be coupled to the frame by coupling the adapter 84 into a seat attachment housing disposed along the frame 81. In one example, the seat attachment housing (such as that described in FIGS. 11-14C below) can be integrally formed with all or a portion of the stroller frame (e.g., integrally formed with front wheel support frame 81*a*). Alternatively, the seat attachment housing can be a separate apparatus that is coupled to the frame 81 or incorporated into the frame 81 by coupling multiple pieces of the frame 81 together. The frame 81 and each seat attachment housing can be made from the same or different materials, including, metals and plastics.

Figure 8A:
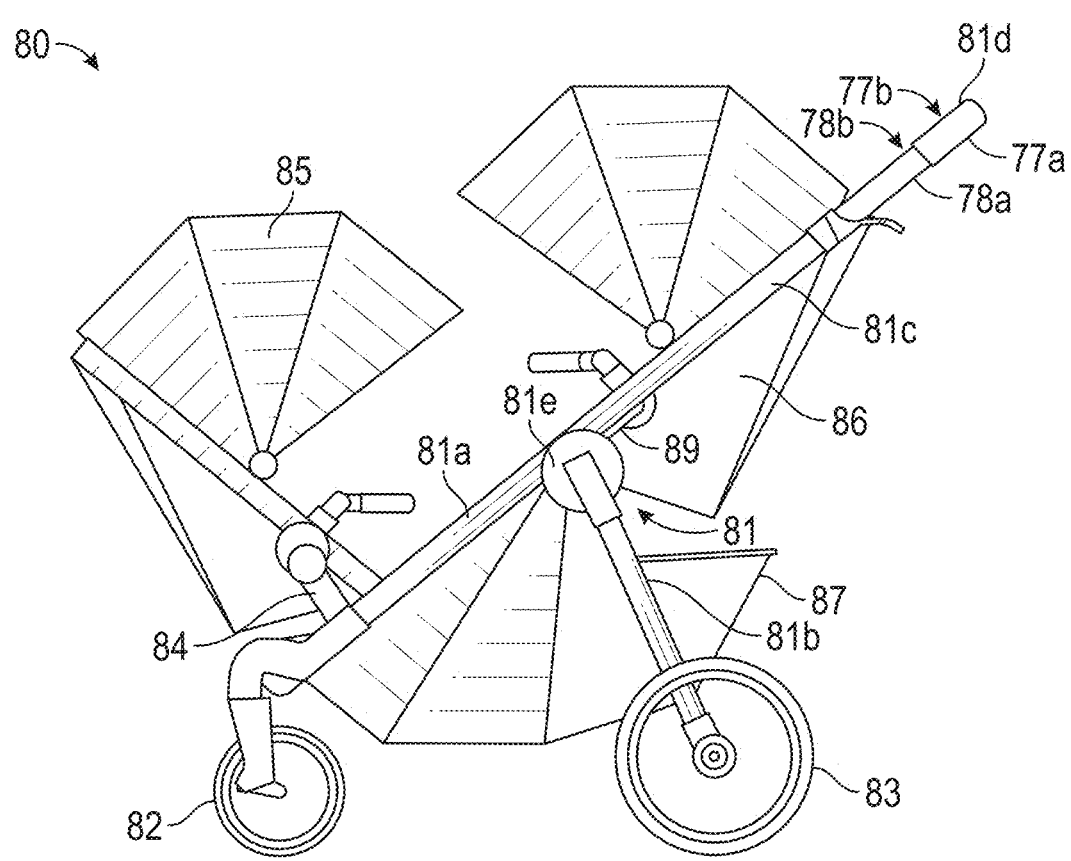
Figure 8B:
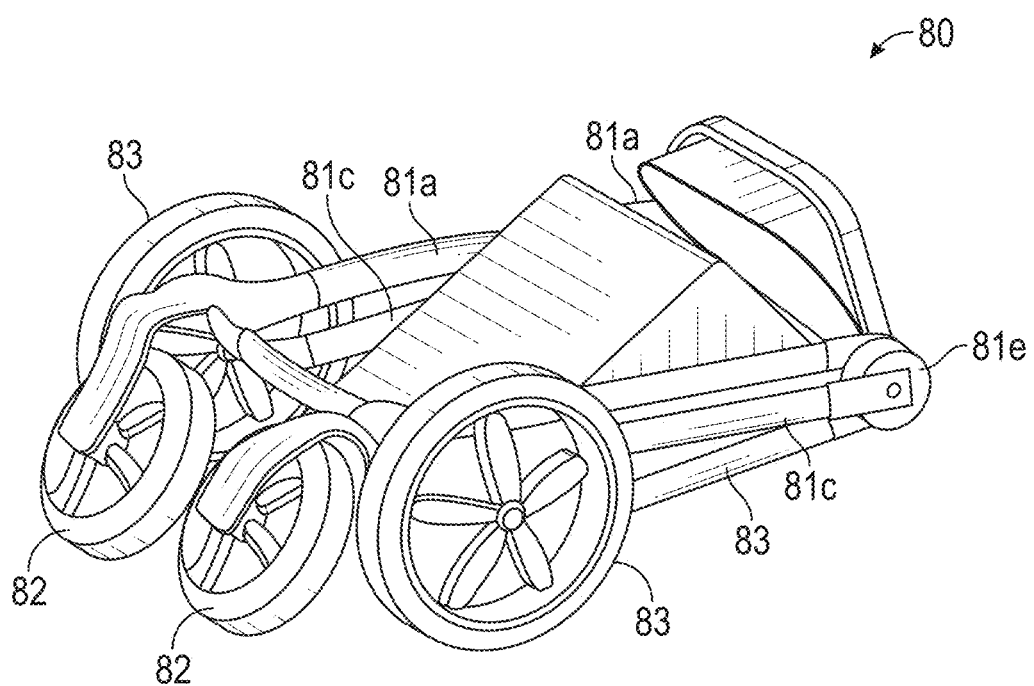
Figure 8C:
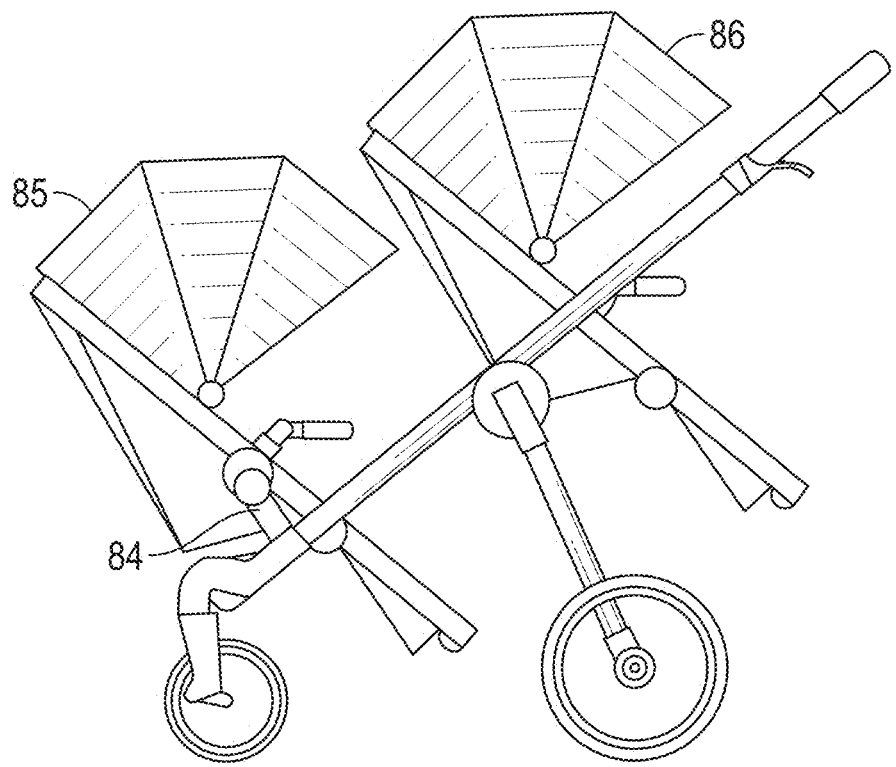
Figure 8D:
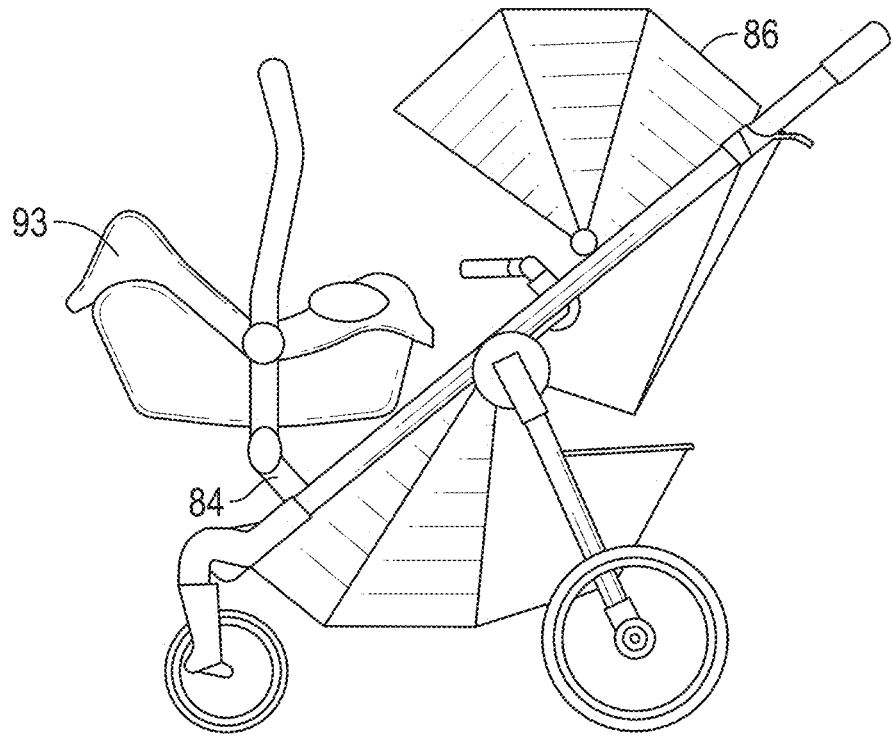

Though it cannot be seen in the side view of FIG. 8A, a typical embodiment of the stroller 80 will include at least two removable seat attachment adapters 84 (at least one along each left and right side of the stroller 80 along the stroller frame 81). For example, at least one removable seat attachment adapter can support each lateral side of the second stroller seat 85. In certain example embodiments, each of the removable seat attachment adapters 84 may be made up of one piece or multiple parts. The removable seat attachment adapters 84 may be of any design capable of securely supporting a seat on the stroller. In one example, the removable seat attachment adapter 84 is configured to have a first end that is removably coupled to the frame 81 and/or seat attachment housing and a distal second end that is configured to be removably coupled to a second stroller seat 85. The removable seat attachment adapter 84 is designed to be capable of supporting the second stroller seat 85 in front of the first stroller seat 86. The stroller 80 may also include a storage basket 87.

In certain examples, each of the removable seat attachment adapters 84 removably couples to the second stroller seat 85 at a vertical height that is substantially below the vertical height that the first stroller seat 86 attaches to the stroller frame 81, thereby positioning the second stroller seat 85 at a vertical position that is substantially below the vertical position of the first stroller seat 86 when both the first stroller seat 86 and the second stroller seat 85 are coupled to the stroller 80. The difference in vertical positioning of the second stroller seat 85 as compared to the first stroller seat 86 provides improved access to the first stroller seat 86 from the front of the stroller 10 when both stroller seats 85, 86 are coupled to the stroller 80. Further, in certain example embodiments, the first stroller seat 85 can be positioned substantially over the front wheels 82 so that the stroller 80 remains stable. For example, the second stroller seat 85 can be located substantially over the front wheels 82 and the first stroller seat 86 can be located substantially over the rear wheels 83. In addition, the seats 85, 86 can be positioned such that the center of gravity of the stroller 80 is between the front 82 and rear 83 wheels.

In certain example embodiments, the removable seat attachment adapter 84 is capable of supporting a second stroller seat 85 such that a child in the second stroller seat 85 is substantially above the frame 81 of the stroller 80 that is substantially adjacent to the connection point of the second stroller seat 85. This positioning of the second stroller seat 85 with respect to the frame 81 provides easier access to the second stroller seat 85, does not block access to the storage basket 87, allows more versatile configurations of the seats 85, 86, allows more variety of seats 85, 86 to be attached to the frame 81, and allows the parent or guardian to more easily monitor and see the child in each stroller seat 85, 86.

The example stroller of FIG. 8A can also include the first stroller seat 86. In certain example embodiments, the first stroller seat 86 can be located generally closer to the handle portion 81*d* than to the front wheels 82. The first stroller seat 86 may be fixedly coupled or removably coupled to the frame 81. In certain example embodiments wherein the first stroller seat 86 is removably coupled to frame 81, the first stroller seat 86 may be adjustable from a forward-facing configuration to a rearward-facing configuration and vice-versa, as shown, for example, in FIGS. 8B-8C. In addition, the second stroller seat 85, when coupled to the corresponding removable seat attachment adapters 84, can be adjustable from a forward-facing configuration to a rearward-facing configuration and vice-versa.

Figure 8E:
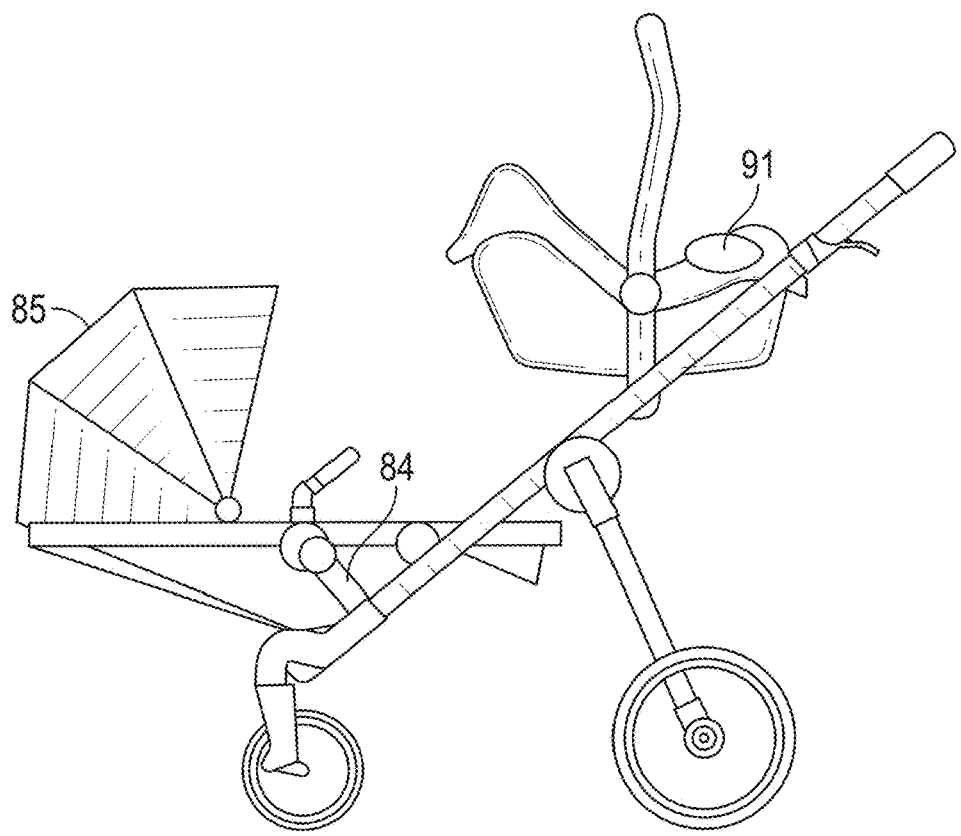
Figure 8F:
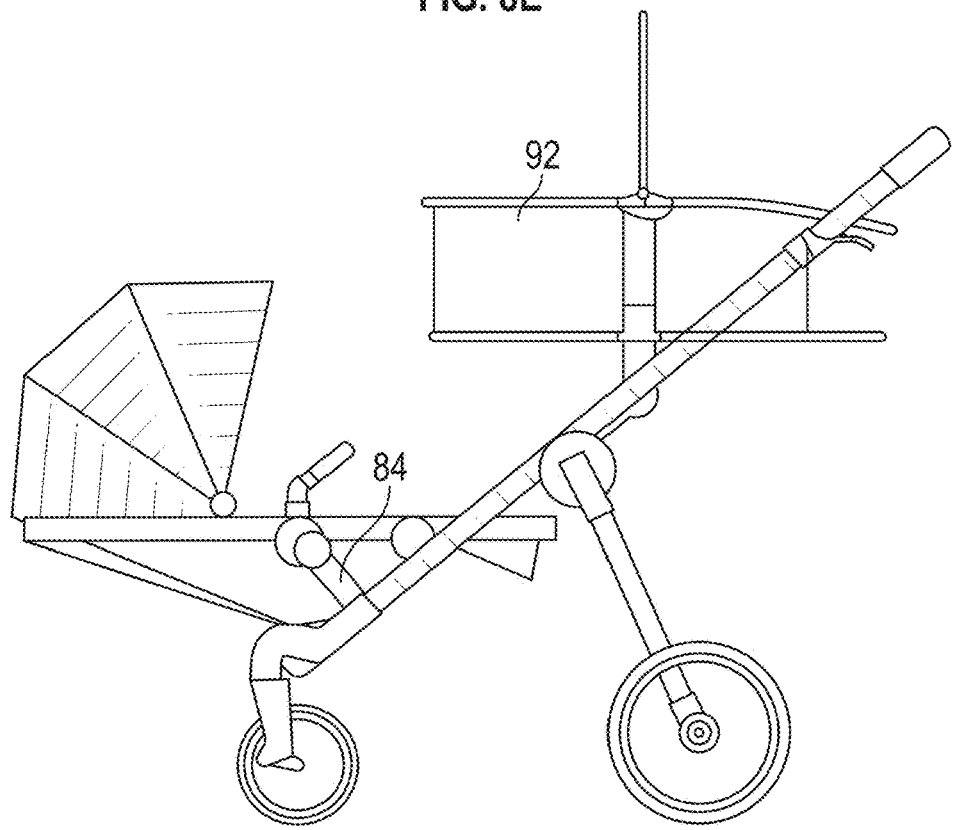
Figure 8G:
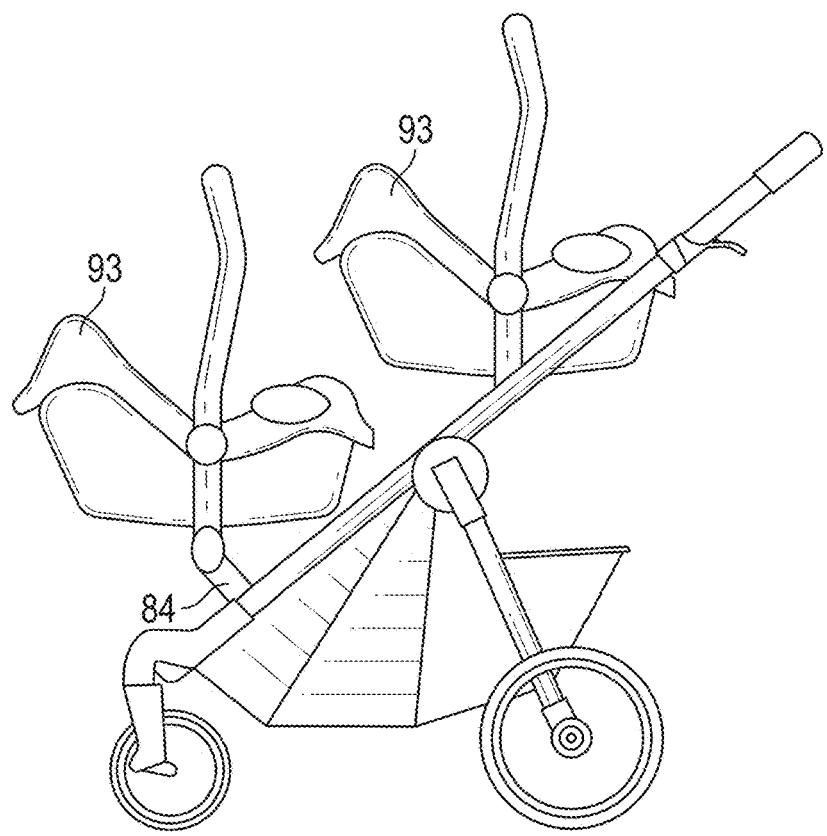
Figure 8H:
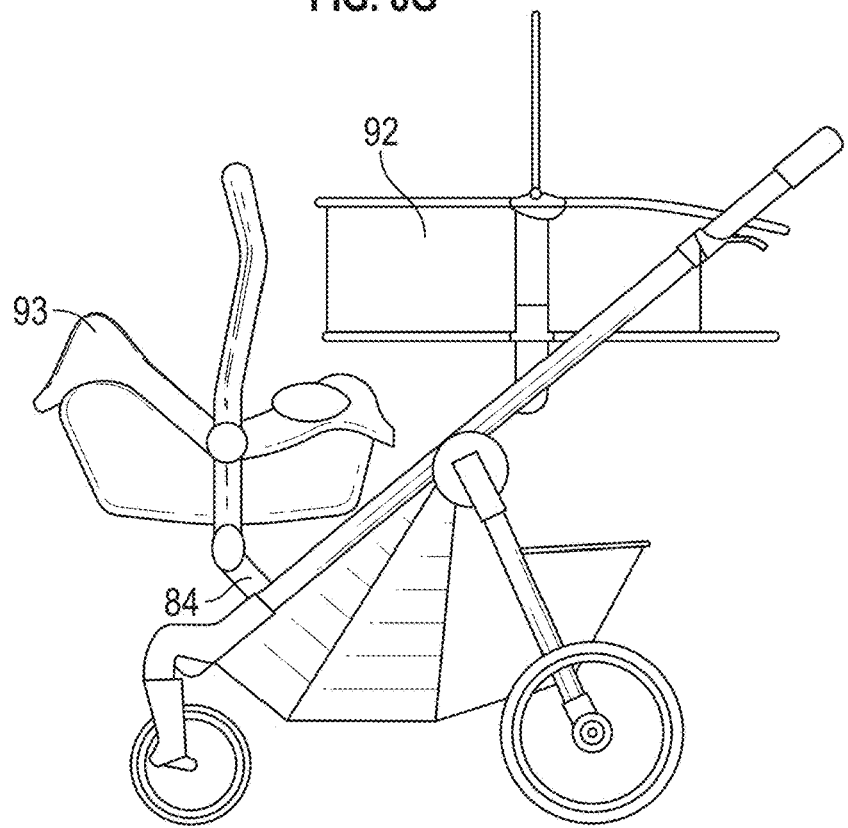

FIGS. 8C-8H present additional examples of combinations for a variety of types of stroller seats that can be removably coupled to the stroller 80. For example, in FIG. 8D, the second stroller seat 85 can be replaced by an infant carrier 93 that can be removably coupled to each of the at least two removable seat attachment adapters 84 and the first stroller seat 86 can be coupled to the stroller in a forward-facing position. In another example, as shown in FIG. 8E, the first stroller seat 86 can be replaced by a child carrier 91 that may be coupled to the frame 81 and positioned in the first seat position and the second stroller seat 85 can be coupled to the stroller by way of the at least two removable seat attachment adapters 84 in a rearward-facing position. In yet another example, as shown in FIG. 8F, the child carrier 91, of FIG. 8E, can be replaced with a pram 92 that is removably coupled to the stroller 80 in the first seat position. In still another example configuration, as shown in FIG. 8G, two child carriers 91 may be removably coupled to the stroller frame 81. For example, the front child carrier can be coupled to the stroller by way of each of the at least two removable seat attachment adapters 84. In another example configuration, one of the child carriers 91 may be replaced with a pram or bassinet 92, as shown in FIG. 8H.

In certain example embodiments, the stroller 80 may also include a second set of removable seat attachment adapters 89 removably coupled to the frame 81 (or another pair of seat attachment housings substantially similar to those 1105, 1110 described below) along the upper tube support frame 81*c*. The second set of removable seat attachment adapters 89 may be substantially the same as or exactly the same as the removable seat attachment adapters 84 described herein and may be coupled to the frame 81 (or corresponding seat attachment housings) in substantially the same manner as the removable seat attachment adapters 84, as discussed in more detail below. The second set of removable seat attachment adapters 89 can include at least two adapters (at least one along each left and right side of the stroller 80) for removably coupling and decoupling the first stroller seat 86 or any other form of seat described herein to the stroller frame 81 or corresponding seat attachment housing.

Figure 9:
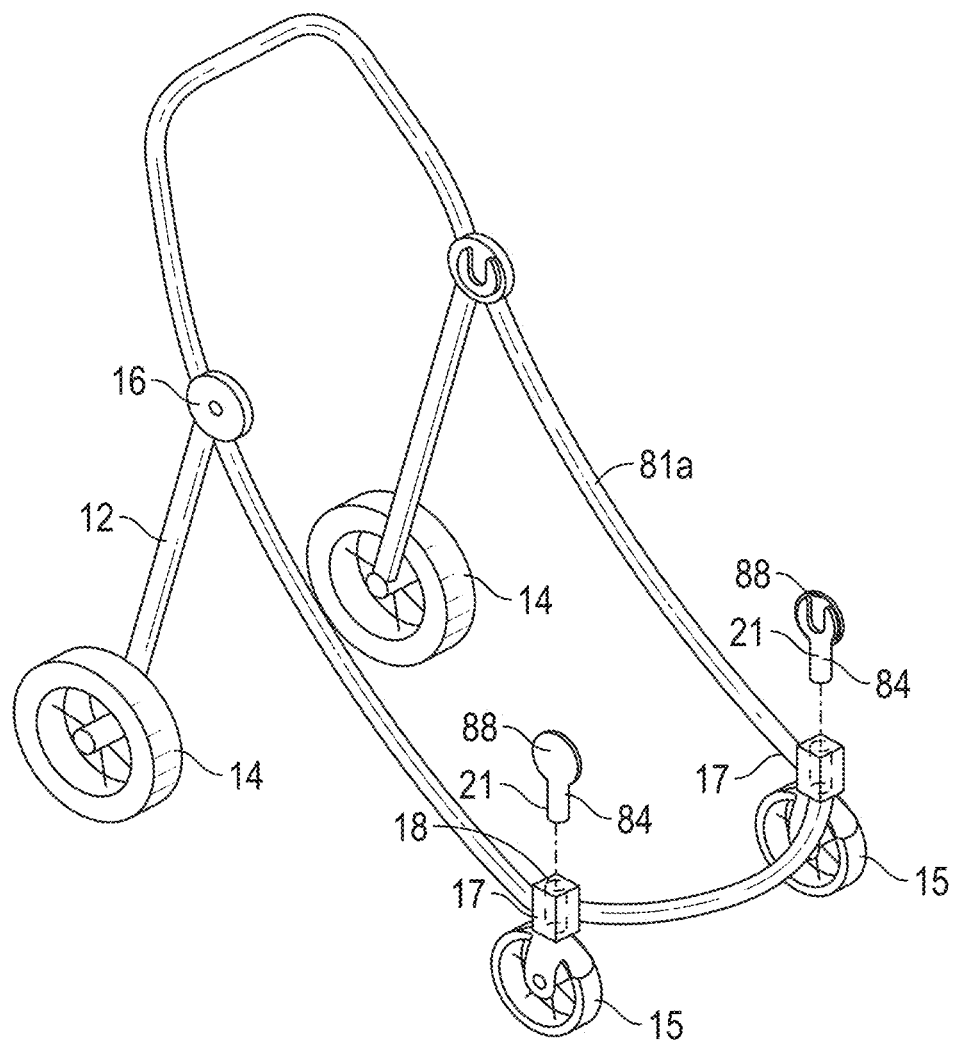
Figure 10:
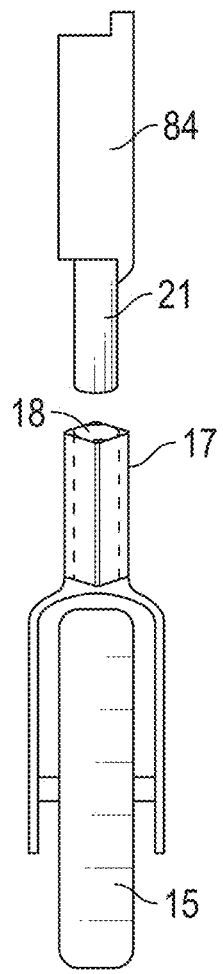

In one example embodiment, as shown in FIGS. 9-10, the stroller 80 can include one or more, and preferably two, seat support elements 84. The seat support element 84 is connected to and can be removably coupled to the stroller 80 front wheel support frame 81*a*. In certain example embodiments, the seat support element 84 is adjacent to the front wheel support portion 81*a* of frame 81. Alternatively, the seat support element 84 is simply forward of and positioned at a vertical level lower than the attachment point for the first stroller seat 86 (FIG. 8A) on the stroller 80. The seat support element 84 is capable of supporting a second stroller seat 85 in front of the stroller seat 86 (see FIG. 8A). This provides convenience and versatility to a user of the stroller Seat support element 84 may be fixedly attached or removably attached to front wheel support portion 81*a*. In certain example embodiments, the front seat 85 may be positioned substantially over the front wheels 15 so the stroller 80 remains stable. Preferably, the seats 85, 86 should be positioned such that the center of gravity of the stroller 80 is between the front 15 and rear 14 wheels. If not an additional wheel may be placed on the attachment as previously described. The seat support element 84 can further include a seat connector 88. In one example, the seat connector 88 can be disposed along a top end of the seat support element 84. The example seat connector 88 may be a multipurpose general connector that allows different seats to be interchanged on the seat support element 84. Any style seat may be configured to connect to the seat connector 88, such as but not limited to, a stroller seat, a baby seat, a bassinet, a pram, a baby carrier, or a car seat, for example. As shown in FIG. 9, the seat support element 84 can also include a connector portion 21. The connector portion 21 is capable of connecting the seat attachment to the frame 81 via the attachment portion 17 and the slot 18.

In certain example embodiments, the connector portion 21 of the seat attachment 20 has a cylindrical or substantially cylindrical shape. The connector portion 21 may be inserted into a cylindrical or substantially cylindrical slot 18 of the attachment portion 17 of the stroller 80 of FIG. 9-10 to secure the seat attachment and convert the single stroller into a double stroller, as shown in FIG. 8A. The connector portion 21 may be of a solid or tubular construction and may be any cross-sectional shape including, but not limited to, circular, polygonal, square, rectangular, and triangular, for example.

FIG. 11 is a partial perspective view of the stroller 80 showing a seat attachment housing 1105 according to one example embodiment of the disclosure. Referring now to FIGS. 8A and 11, the example stroller 80 can include a first seat attachment housing 1105 and the second seat attachment housing 1110. The first seat attachment housing 1105 can include a first end 1105*a* having a cavity for slidably receiving and fixedly or slidably coupling the first end 1105*a* to a first end of the left front wheel support frame 81*a*. For example, the left front wheel support frame 81*a* can have a substantially circular or oval cross-section and the cavity of the first end 1105*a* can have a corresponding circular or oval cross-section to slidably receive a portion of the left front wheel support frame 81*a* into the cavity. In one example, the left front wheel support frame 81*a* can be held in the cavity of the first end 1105*a* by a press fit hold. Alternatively, a spring-loaded button on the left front wheel support frame 81*a* can be positioned into a corresponding opening along one of the sides of the first seat attachment housing 1105.

The first seat attachment housing 1105 can also include a second end 1105*b* that includes a second cavity for coupling one of the front wheels 82 to the first seat attachment housing 1105. The wheel 82 may be removably coupled to the second end 1105*b* of the first seat attachment housing 1105 by a press fit hold. Alternatively, a spring-loaded button 82*a* on the front wheel apparatus 82 can be positioned into the cavity of the second end 1105*b* and positioned into a corresponding opening 1115 along one of the sides of the first seat attachment housing 1105. In one example embodiment, the first seat attachment housing 1105 can include an attachment arm 1120 extending off of one side of the first seat attachment housing 1105 in a generally orthogonal direction to the longitudinal axis of the housing 1105. The attachment arm 1120 can include a free end 1105c that includes a cavity for receiving therein and fixedly coupling or slidably coupling the first seat attachment housing 1105 to a first end of the foot rest support frame 81f. The foot rest support frame 81f may be removably coupled to the free end 1105c of the attachment arm 1120 by a press fit hold. Alternatively, a spring-loaded button on the foot rest support frame 81f can be positioned into the cavity of the free end 1105c and positioned into a corresponding opening along one of the sides of the attachment arm 1120.

The second seat attachment housing 1110 can include a first end 1110a having a cavity for slidably receiving and fixedly or slidably coupling the first end 1110a to a first end of the right front wheel support frame 81a. For example, the right front wheel support frame 81a can have a substantially circular or oval cross-section and the cavity of the first end 1110a can have a corresponding circular or oval cross-section to slidably receive a portion of the right front wheel support frame 81a into the cavity. In one example, the right front wheel support frame 81a can be held in the cavity of the first end 1110a by a press fit hold. Alternatively, a spring-loaded button on the right front wheel support frame 81a can be positioned into a corresponding opening along one of the sides of the second seat attachment housing 1110.

The second seat attachment housing 1110 can also include a second end 1110b that includes a second cavity for coupling one of the front wheels 82 to the second seat attachment housing 1110. The wheel 82 may be removably coupled to the second end 1110b of the second seat attachment housing 1110 by a press fit hold. Alternatively, a spring-loaded button on the front wheel apparatus 82 can be positioned into the cavity of the second end 1110b and positioned into a corresponding opening along one of the sides of the second seat attachment housing 1110. In one example embodiment, the second seat attachment housing 1110 can include an attachment arm 1125 extending off of one side of the second seat attachment housing 1110 in a generally orthogonal direction to the longitudinal axis of the housing 1110. The attachment arm 1125 can include a free end 1110c that includes a cavity for receiving therein and fixedly coupling or slidably coupling the second seat attachment housing 1110 to a second distal end of the foot rest support frame 81f. The second end of the foot rest support frame 81f may be removably coupled to the free end 1110c of the attachment arm 1125 by a press fit hold. Alternatively, a spring-loaded button on the foot rest support frame 81f can be positioned into the cavity of the free end 1110c and positioned into a corresponding opening along one of the sides of the attachment arm 1125.

In certain example embodiments, all or a portion of each of the seat attachment housings 1105, 1110 can be hollowed out with exterior sides. Each of the seat attachment housings 1105, 1110 can include an opening 1130 positioned along a top side of the respective seat attachment housings 1105, 1110. The opening 1130 can provide access to an adapter receiving cavity (see FIG. 12) for receiving therein at least a portion of the removable seat attachment adapter 84 (see FIG. 13A). Each seat attachment housing 1105, 1110 can also include a sliding door 1135. The sliding door 1135 is configured to be manually adjustable from a closed position to an open position by slidably opening the door 1135 along the top side of the seat attachment housing 1105, 1110 to provide access to the opening 1130 and adapter receiving cavity when the parent or guardian wants to insert and couple the removable seat attachment adapter 84 to the seat attachment housing 1105, 1110 and frame 81 in order to couple the second stroller seat 85 to the stroller 80. In one example, each seat attachment housing 1105, 1110 can include one or more rails either disposed above or below a top surface of the seat attachment housing 1105, 1110 that provide a guide way for slidably opening and closing the door 1135. In one example, the door 1135 can include a tab 1140 extending upward from a top surface of the door 1135 to provide a gripping area to grip the door 1135 and slide it open and closed. For example, a parent or guardian can use a finger against the tab 1140 and apply pressure against the tab 1140 to open the door 1135 from a closed configuration to an open configuration.

The sliding door 1135 is also configured to be manually adjustable from an open configuration to a closed configuration by slidably closing the door 1135 along the top side of the seat attachment housing 1105, 1110 to prevent access to the opening 1130 and adapter receiving cavity when the second stroller seat 85 is not in use. In one example, the parent or guardian can press a finger against the tab 1140 and apply pressure against the tab 1140 to slide the door 1135 from the open configuration to the closed configuration.

Figure 12:
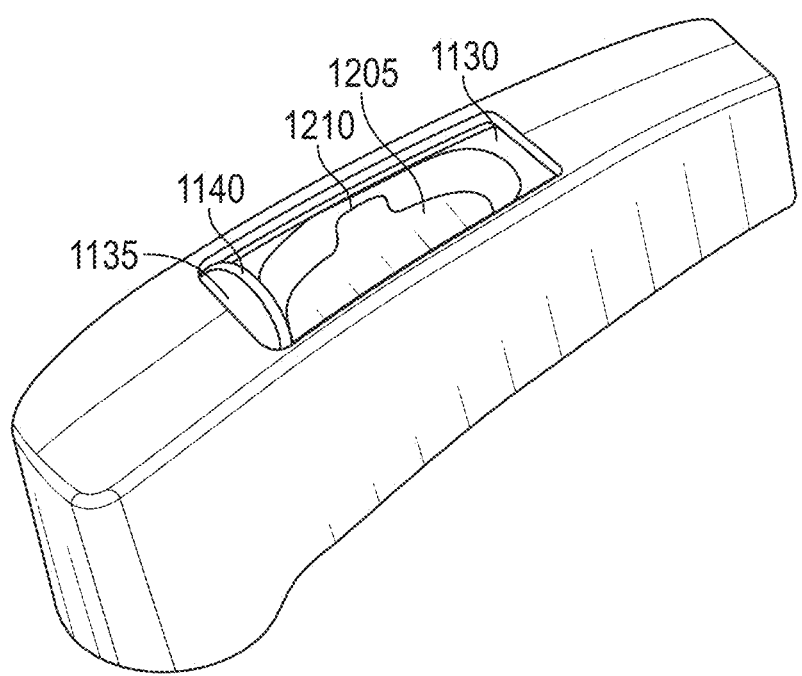
FIG. 12 is a partial perspective view of the seat attachment housing according to one example embodiment of the disclosure.

FIG. 12 is a partial perspective view of one of the seat attachment housings 1105, 1110 according to one example embodiment of the disclosure. Referring now to FIGS. 8A, 11, and 12, the door 1135 of the seat attachment housing 1105, 1110 is shown having been slid into the open configuration exposing the opening 1130 and the adapter receiving cavity 1205. The adapter receiving cavity 1205 can have any size and shape for removably coupling a portion of a removable seat attachment adapter 84 therein. In one example embodiment, all or a portion of the cross-sectional shape of the adapter receiving cavity 1205 can be keyed or have a keyed shape 1210 and all or a portion of the removable seat attachment adapter 84 can have a corresponding outer perimeter shape such that the removable seat attachment adapter 84 can only be inserted into the adapter receiving cavity 1205 in one, proper orientation.

FIGS. 13A-C are partial perspective views of the removable seat attachment adapter 84 coupled to the seat attachment housing 1105 according to one example embodiment of the disclosure. Now referring to FIGS. 8A, 11, 12, and 13A-C, once the door 1135 has been moved into the open configuration exposing the opening 1130 and the adapter receiving cavity 1205, a first end 84a of the removable seat attachment adapter 84 can be inserted into the adapter receiving cavity 1205. In certain example embodiments, the adapter receiving cavity 1205 can include one or more stop flanges 1315, 1320 that extend out from an inner surface of the cavity 1205 and into the cavity area to abut against a bottom side of the first end 84a of the removable seat attachment adapter 84 when the adapter 84 has penetrated a sufficient amount into the adapter receiving cavity 1205. Once the adapter 84 is inserted into the cavity 1205 and removably coupled to the seat attachment housing 1105, a stroller seat can be removable coupled to a seat connector disposed on or adjacent to the second end 84b of the removable seat attachment adapter 84. The seat connector on the second end 84b can be a multipurpose general connector that allows different seats to be interchangeably connected to the removable seat attachment adapter 84. Any style seat may be configured to connect to the seat connector including, but not limited to, a stroller seat, a baby seat, a bassinet, a pram, a baby carrier, or a car seat, for example.

The removable seat attachment adapter 84 can also include a stop collar 1335 disposed a predetermined distance up from the first end 84a of the adapter 84. In one example embodiment, the stop collar 1335 is sized and shaped so that it will not fit into the opening 1130 and will not fit into the adapter receiving cavity 1205 as the first end 84a of the adapter 84 is being inserted into the adapter receiving cavity 1205. The size and shape of the outer surface of the stop collar 1335, being greater than that of the outer surface of the previous portion of the first end 84a inserted into the adapter receiving cavity 1205 will contact and abut an outer surface of the seat attachment housing 1105 when the adapter 84 has penetrated a sufficient amount into the adapter receiving cavity 1205.

The removable seat attachment adapter 84 can also include a spring-loaded latching tab 1305 disposed along one side of the adapter 84 between the first end 84a and the stop collar 1335. In certain example embodiments, the spring-loaded latching tab 1305 can be spring biased into an extended position (as shown in FIG. 13B) via, for example, a spring (not shown). As the adapter 84 is first being inserted into the adapter receiving cavity 1205, the width of the adapter 84 at the point of the spring-loaded latching tab 1305, is greater than the width of the cavity 1205, which causes one or more side walls of the cavity 1205 to apply a force to the spring-loaded latching tab 1305 and push it inward from the extended position towards a retracted position, thereby allowing the first end 84a of the adapter 84 to continue moving into the adapter receiving cavity 1205. When the adapter 84 is inserted into the adapter receiving cavity 1205 a sufficient distance (which can be configurable based on the design specifics on the stroller), the spring-loaded latching tab 1305 can be positioned adjacent a tab receiver 1307. The tab receiver 1307 can be a cut-out or opening along one of the side walls of the cavity 1205 that allows the tab 1305 to move back to the extended position. The tab receiver 1307 can include a tab retainer surface 1310 that abuts a top side of the tab 1305 and prevents the removable seat attachment adapter 84 from being removed from the adapter receiving cavity 1205 while the spring-loaded latch tab 1305 is in the extended position.

The removable seat attachment adapter 84 can also include a tab release button 1330 that is operatively coupled to and configured to move the spring-loaded latching tab 1305 from the extended position to the retracted position via, for example, a guide wire 1325 or other attachment mechanism. For example, when the removable seat attachment adapter 84 is latched into the seat attachment housing 1105, a parent or guardian can grab the removable seat attachment adapter 84 and depress the tab release button 1330, causing the guide wire to pull the spring-loaded latching tab 1305 inward from the extended position to the retracted position with a force greater than the spring biasing force on the tab 1305 and allowing the parent or guardian to remove the removable seat attachment adapter 84 from the adapter receiving cavity 1205 using only a single hand. Thereby, the ease of decoupling the removable seat attachment adapter 84 from the stroller frame 81 is improved.

In addition, as shown in FIG. 13B, in certain example embodiments, the bottom end of the adapter receiving cavity 1205 and corresponding bottom end of the seat attachment housing 1105 can be open 1340 to the environment. Leaving the bottom side of the cavity 1205 open 1340 to the environment helps to prevent liquid and material build-up in the cavity 1205 when the removable seat attachment adapter 84 is not coupled into the cavity 1205 by allowing the liquid and materials to pass through the cavity 1205 and out of the bottom of the seat attachment housing 1105. This is especially beneficial when the parent or guardian removes the removable seat attachment adapter 84 from the cavity 1205 but does slide the door 1135 into the closed position to close up the opening 1130.

FIGS. 14A-C are partial perspective views of an alternative embodiment of the seat attachment housing 1405, 1410 according to another example embodiment of the disclosure. Referring now to FIGS. 8A, 11, and 14A-C, the seat attachment housings 1405, 1410 are substantially the same as the seat attachment housings 1105, 1110 described in FIGS. 11-13C except for as described below. Therefore, the description of the seat attachment housings 1105, 1110 in FIGS. 11-13C above is incorporated herein for the alternative seat attachment housings 1405, 1410, except with regard to the distinctions described below.

As shown in FIG. 14C, each seat attachment housing 1405, 1410 includes an opening or open end 1130 positioned along a top side of the respective seat attachment housings 1405, 1410. The opening 1130 can provide access to an adapter receiving cavity 1205. Each seat attachment housing 1405, 1410 also includes one or more stop flanges 1315, 1320 that extend out from an interior wall 1411 of the cavity 1205 and into the cavity area. In addition, the bottom end of the adapter receiving cavity 1205 and corresponding bottom end of each seat attachment housing 1405, 1410 can have an opening or open end 1340 to the environment and with the cavity 1205 and opening 1130 provides a through-hole 1413 through the seat attachment housing 1405, 1410.

Each seat attachment housing 1405, 1410 can include a rotating door 1415 rotatably coupled to the seat attachment housing 1405, 1410. For example, the rotating door 1415 can have a fixed end that is rotatably coupled to the top side of the seat attachment housing 1405, 1410 or an interior wall 1411 of the opening 1130 or adapter receiving cavity 1205 by way of one or more hinges 1420. Alternatively, other devices may be used to allow the door 1415 to rotate from a closed configuration 1415a to an open configuration 1415b, as shown in FIG. 14C. In certain example embodiments, the door 1415 and/or the rotating mechanism or hinge 1420 that the door 1415 is coupled to can be spring-biased into the closed configuration 1415a through the use of a spring or other biasing means. Spring-biasing the door 1415 into a closed configuration 1415a can help to prevent fluids and other material contaminants from entering the adapter receiving cavity 1205 when the removable seat attachment adapter 84 is not coupled into the adapter receiving cavity 1205.

When a parent or guardian wants to add a second stroller seat 85 to the stroller 80, they can insert the removable seat attachment adapter 84 into the adapter receiving cavity 1205 by pressing or applying a force with the first end 84a of the removable seat attachment adapter 84 against the top side of the rotating door 1415 with a force that is greater than the spring-biasing force. This will cause the door 1415 to rotate from the closed configuration 1415a towards the open configuration 1415b and allow the first end 84a of the removable seat attachment adapter to enter into the adapter receiving cavity 1205 and be coupled to the seat attachment housing 1405, 1410.

When the parent or guardian removes the removable seat attachment adapter 84, as described above with regard to FIGS. 13A-C, as the first end 84a of the removable seat attachment adapter 84 exits the adapter receiving cavity 1205 and opening 1130, the spring-bias of the hinge 1420 or door 1415 will cause the door 1415 to automatically rotate from the open configuration 1415b to the closed configuration 1415a, thereby limiting access to the opening 1130 and the adapter receiving cavity 1205 from the top side of the seat attachment housing 1405, 1410.

While the above description contains many specifics, these specifics should not be construed as limitations on the scope of the disclosure, but merely as exemplifications of the disclosed embodiments. Those skilled in the art will envision many other possible variations that are within the scope of the disclosure.

What is claimed is:

1. A convertible stroller configured for being converted from a single stroller to a double stroller, the stroller comprising:
    a stroller frame configured for being adjusted between a folded configuration and an unfolded configuration, the stroller frame comprising: a handle portion; a front wheel support portion; and a back wheel support portion;
    at least one front wheel secured directly to the front wheel support portion;
    two rear wheels secured to the back wheel support portion;
    a first seat removably attached to the stroller frame;
    a first seat attachment portion removably attached directly to the stroller frame, wherein a connector portion of the first seat attachment portion does not extend in front of the at least one front wheel, the first seat attachment portion comprising a locking mechanism that is configured to secure the first seat attachment portion to the stroller frame when the stroller frame is in the folded configuration; and
    a second seat removably attached to the first seat attachment portion and positioned in front of the first seat;
    wherein at least one of the first seat and the second seat is configured for being removably attached to the stroller frame in a forward-facing configuration and a backward-facing configuration; and wherein the first seat and the second seat are positioned such that a center of gravity of the stroller is between the at least one front wheel and the two rear wheels.

2. The stroller of claim 1, wherein the second seat is positioned over the at least one front wheel.

3. The stroller of claim 1, wherein the first seat is positioned over the two rear wheels.

4. The stroller of claim 1, wherein the first seat is positioned adjacent to the handle portion.

5. The stroller of claim 1, wherein the first seat is positioned nearer to the handle portion than the second seat.

6. The stroller of claim 1, wherein the first seat attachment portion is removably attached to the front wheel support portion.

7. The stroller of claim 1, wherein the first seat attachment portion supports the second seat above the at least one front wheel.

8. The stroller of claim 1, wherein the first seat attachment portion comprises a seat connector configured for connecting to the second seat.

9. The stroller of claim 1, wherein the stroller further comprises a second seat attachment portion connected to the stroller frame; and
    wherein the first seat is removably attached to the second seat attachment portion.

10. The stroller of claim 9, wherein the first seat attachment portion is removably attached to the front wheel support portion, and
    wherein the second seat attachment portion is connected to the stroller frame adjacent to the handle portion.

11. The stroller of claim 1, wherein the first seat is configured for being attached to the stroller frame in a forward-facing configuration and a backward-facing configuration.

12. The stroller of claim 1, wherein the at least one front wheel comprises two front wheels secured to the stroller frame's front wheel support portion.

13. The stroller of claim 1, wherein the second seat is configured for being attached to the first seat attachment portion in a forward-facing configuration and a backward-facing configuration.

14. The stroller of claim 1, wherein the first seat is configured for being removably attached to the stroller frame at a first vertical position, and the second seat is configured for being removably attached to the one or more seat attachment portions at a second vertical position that is below the first vertical position.

15. The stroller of claim 1, wherein the handle portion and the front wheel support portion are parallel when the stroller frame is in the unfolded configuration.

16. A convertible stroller configured for being converted from a single stroller to a double stroller, the stroller comprising:
    a stroller frame configured for being adjusted between a folded configuration and an unfolded configuration, the stroller frame comprising: a handle portion; a front wheel support portion; and a back wheel support portion;
    only two front wheels secured to the front wheel support portion, wherein the only two front wheels are aligned on opposite sides of the stroller frame;
    only two rear wheels secured to the back wheel support portion;
    a first seat removably attached to the stroller frame;
    a first seat attachment portion removably attached directly to the stroller frame, wherein a connector portion of the first seat attachment portion does not extend in front of the at least one front wheel, the first seat attachment portion comprising a locking mechanism that is configured to secure the first seat attachment portion to the stroller frame when the stroller frame is in the folded configuration; and
    the first seat attachment portion does not extend in front of the two front wheels; and
    a second seat removably attached to the first seat attachment portion and positioned in front of the first seat;
    wherein at least one of the first seat and the second seat is configured for being removably attached to the stroller frame in a forward-facing configuration and a backward-facing configuration; and wherein the first seat and the second seat are positioned such that a center of gravity of the stroller is between the two front wheels and the two rear wheels.

* * * * *